US008762965B2

(12) United States Patent
Alpern et al.

(10) Patent No.: US 8,762,965 B2
(45) Date of Patent: *Jun. 24, 2014

(54) SIMPLIFYING THE DEPLOYMENT AND SERVICEABILITY OF COMMERCIAL SOFTWARE ENVIRONMENTS

(75) Inventors: Bowen L. Alpern, Peekskill, NY (US); Joshua S. Auerbach, Ridgefield, CT (US); Vasanth Bala, Rye, NY (US); Thomas V. Frauenhofer, Stony Point, NY (US); Jobi George, Somers, NY (US); Todd W. Mummert, Danbury, CT (US); Michael A. Pigott, Coram, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,668

(22) Filed: Aug. 31, 2012

(65) Prior Publication Data

US 2012/0330640 A1 Dec. 27, 2012

Related U.S. Application Data

(60) Division of application No. 12/404,421, filed on Mar. 16, 2009, now Pat. No. 8,286,147, which is a continuation of application No. 10/929,337, filed on Aug. 30, 2004, now Pat. No. 7,506,338.

(51) Int. Cl.
*G06F 9/45* (2006.01)

(52) U.S. Cl.
USPC ........... 717/138; 717/120; 717/129; 717/148; 717/153; 718/1; 718/102

(58) Field of Classification Search
None
See application file for complete search history.

(56) References Cited

U.S. PATENT DOCUMENTS

| | | | | |
|---|---|---|---|---|
| 6,298,370 | B1 * | 10/2001 | Tang et al. | 718/102 |
| 6,496,847 | B1 * | 12/2002 | Bugnion et al. | 718/1 |
| 6,795,966 | B1 * | 9/2004 | Lim et al. | 718/1 |
| 6,907,519 | B2 * | 6/2005 | Desoli | 712/227 |
| 7,124,237 | B2 * | 10/2006 | Overton et al. | 711/6 |
| 7,260,820 | B1 * | 8/2007 | Waldspurger et al. | 718/1 |
| 7,320,129 | B2 * | 1/2008 | Talwar et al. | 718/1 |
| 7,478,173 | B1 * | 1/2009 | Delco | 709/250 |
| 7,620,955 | B1 * | 11/2009 | Nelson | 719/312 |
| 7,783,779 | B1 * | 8/2010 | Scales et al. | 709/240 |
| 7,934,020 | B1 * | 4/2011 | Xu et al. | 709/250 |
| 2002/0052727 | A1 * | 5/2002 | Bond et al. | 703/26 |
| 2002/0056076 | A1 * | 5/2002 | Made | 717/129 |
| 2002/0143842 | A1 * | 10/2002 | Cota-Robles et al. | 709/1 |
| 2003/0074458 | A1 * | 4/2003 | Gokhale | 709/230 |
| 2003/0101334 | A1 * | 5/2003 | Desoli | 712/227 |
| 2003/0101439 | A1 * | 5/2003 | Desoli et al. | 717/148 |
| 2003/0172305 | A1 * | 9/2003 | Miwa | 713/201 |
| 2003/0182653 | A1 * | 9/2003 | Desoli et al. | 717/138 |
| 2004/0015920 | A1 * | 1/2004 | Schmidt | 717/153 |
| 2004/0025158 | A1 * | 2/2004 | Traut | 718/1 |
| 2004/0122874 | A1 * | 6/2004 | Garthwaite | 707/206 |

(Continued)

*Primary Examiner* — Isaac Tecklu
(74) *Attorney, Agent, or Firm* — Michael J. Buchenhorner

(57) ABSTRACT

An information processing system includes a preparation machine with an installed image; an execution machine on which the installed image is virtually installed; and a virtualizer for virtualizing the installed image on the execution machine to produce a virtually installed image by using a hierarchy of selective virtualizers, wherein the virtualizing is selective such that not all operations of the executing software of the installed image at any particular level are virtualized.

11 Claims, 4 Drawing Sheets

(56) References Cited

U.S. PATENT DOCUMENTS

| | | |
|---|---|---|
| 2004/0123290 A1* | 6/2004 | Overton et al. .................... 718/1 |
| 2004/0218208 A1* | 11/2004 | Akiyoshi et al. ............. 358/1.15 |
| 2005/0028147 A1* | 2/2005 | Bonilla ......................... 717/138 |
| 2005/0076155 A1* | 4/2005 | Lowell ............................... 710/1 |
| 2005/0080934 A1* | 4/2005 | Cota-Robles et al. ............ 710/1 |
| 2005/0091652 A1* | 4/2005 | Ross et al. ........................ 718/1 |
| 2005/0108440 A1* | 5/2005 | Baumberger et al. ............. 710/1 |
| 2005/0138620 A1* | 6/2005 | Lewites ............................ 718/1 |
| 2005/0229154 A1* | 10/2005 | Hiew et al. .................... 717/110 |
| 2008/0313282 A1* | 12/2008 | Warila et al. .................. 709/206 |

\* cited by examiner

SIMPLIFYING THE DEPLOYMENT AND SERVICEABILITY OF COMMERCIAL SOFTWARE ENVIRONMENTS

CROSS-REFERENCE TO RELATED APPLICATIONS

This application is a division of, and claims priority to, U.S. patent application Ser. No. 12/404,421, filed on Mar. 16, 2009, which application is itself a continuation of, and claims priority from, commonly-owned U.S. application Ser. No. 10/929,337, filed on Aug. 30, 2004, now U.S. Pat. No. 7,506,338.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of commercial software for network computing systems and more particularly relates to the field of updating and deploying commercial software for network computing systems.

BACKGROUND OF THE INVENTION

The complexity of modern software applications has made the installation, maintenance and support of large software systems difficult and expensive. Increasingly greater skill is required for installing and configuring commercial software systems such as web servers, databases, portals, and messaging and transaction processing systems. Complex software environments such as these pose both administrative and serviceability challenges.

As an administrator of such an environment, it is challenging to keep all of the installed applications on the system up to date with vendor issued patches, because the timing of when to apply a patch depends on when the business environment can tolerate the disruption, not when it is convenient for a particular software vendor. As a result, it is common for customers to be out of synchronization with a software vendor's recommended current version. This problem is compounded when the software system consists of multiple interdependent applications, yet the system as a whole must be administered as a unit.

As a service and support organization, it is challenging to fully understand the state of every customer's installed system, because different customers may have slightly different variants of the same system due to differences in the choices and the timing of applying patches and upgrades. As a result, problem diagnosis continues to increase in difficulty as the number of variations of a software system in the field proliferates beyond the capacity of any services and support organization to fully understand the idiosyncrasies of every variant.

Over time, this situation forms a vicious circle. Customers become more conservative in applying new patches because of the risk of moving from a system whose behavior (and idiosyncrasies) is more predictable to one whose behavior is less predictable. This, in turn, makes the customers' platform get further out of synchronization with vendor-recommended and supported versions, resulting in increased service and support costs.

Although a number of techniques exist for simplifying the task of software maintenance, none of them address the serviceability problem that results from a proliferation of unsupported system variants in the field arising from the inability of software vendors and service and support organizations to control the choice or timing of applying customer patches and upgrades. Automated patch installation and self-update mechanisms are examples of techniques that simplify the task of software maintenance. But business-critical systems rarely employ these automated mechanisms as customers generally prefer tighter control over the choice and timing of applying updates. Automation of install and update procedures is therefore not an adequate solution to the serviceability problem.

The installed image of a software system is a focal point of any solution that addresses software installation, maintenance and serviceability issues. An installed image includes the file system layout consisting of executable code and other text or binary artifacts, environment variables (such as registry entries on Windows platforms), and implicit dependencies on items outside of the installed image (such as system libraries and other locally installed applications).

Conventional mechanisms for creating an installed image fall into two categories: an explicit install model and an implicit install model. In the explicit install model, each application is installed individually on every machine on which it will execute. In the implicit install model, applications are installed once on an install machine, and the same installed image is executed everywhere. The implicit install model can be realized in two ways: through image copying or through virtualization.

Image copying refers to the copying of an installed image from the install machine to an execution machine. A common method for doing this is by mounting one or more file systems containing the installed image onto the execution machine. In this scheme, a file server on the install machine and a file system driver (or equivalent logic) on the execution machine cooperate to page the installed image over a network connection.

Image copying is straightforward to implement, but has several limitations. A first limitation is that applications requiring non-file system artifacts (such as environment variables and registry entries) to be initialized prior to execution cannot be installed using this model. Conventional solutions based on image copying via file system mounting address this limitation by ensuring that a special prepare step is executed prior to execution of the application itself, which temporarily initializes the execution machine's environment for the duration of the application's execution. One problem with this approach is that restoration of the original execution machine environment cannot be performed reliably in the event of an application or operating system (OS) crash.

A second limitation of image copying is that the copied image may interfere with existing file system and environment artifacts belonging to normally installed applications on the execution machine. A third limitation of image copying is that multiple variants (e.g. different patch levels of the same application installed image) cannot co-exist simultaneously. Differing installed images must occupy distinct areas of the file system in order to co-exist, which can incur significant storage redundancy due to duplication of the portions of the two images that are identical. Furthermore, if the different installed images need to set conflicting values for environment variables (such as Windows registry entries), only one can operate at any given time.

Virtualization refers to the interception of an application's communication with its underlying runtime platforms such as the OS or a JVM (a virtual machine using Java technology). Virtualization can be used to give an application the illusion that it is running in the context of its install machine, even though it is executing in the (possibly different) context of a host execution machine. Conventional full-system virtualization techniques emulate a hardware machine on which an OS (distinct from that of the host execution machine) can be booted. Full-system virtualization incurs a significant performance penalty, and is primarily intended for testing and porting across different OS platforms. Assuming that installed images are always platform-specific (e.g. a Windows/x86 and a Linux/x86 application will each have a separate platform-specific installed image), then much of the host execution machine's operating system and hardware interfaces can be used directly without virtualization. This selective virtualization approach incurs significantly lower performance overhead than full-system virtualization and is practically indistinguishable from direct execution performance.

FIG. 1 is a block diagram showing the system architecture of a computer system implementing a conventional explicit install model and an implicit install model. FIG. 1 shows an execution machine 100, on which is installed an installed image 102 of a computer program or application, and execution machine 120, on which is installed an installed image 122 of the computer program or application. The installed images 102 and 122 are created via an explicit install step, which writes the full installed image of the application to disk and performs the initialization of the execution machine's environment that is necessary for proper execution of the application. The installed images 102 and 122 of the application are executed on the execution machines 100 and 120, respectively. This configuration adheres to the explicit install model, as explained in greater detail above.

FIG. 1 further shows an install machine 104, on which is installed an installed image 106 of a computer program or application. The execution machines 100 and 120 are linked to the installed image 106 on the install machine 104 and executes the installed image 106. The execution machines 100 and 120 can mount a file system containing the installed image 106 wherein a file server on the install machine 104 and a file system driver (or equivalent logic) on the execution machines 100 and 120 cooperate to page the installed image 106 over a network connection 135 via network 108 or a direct connection 110 and 130, respectively. This configuration adheres to the implicit install model, as explained in greater detail above. It should be noted that although only two execution machines 100 and 120 are shown in FIG. 1, the present invention supports any number of execution machines interacting with an install machine 104 in order to execute an installed image.

Deployment refers to making software accessible to users. Deployment can occur by installation on machines owned by the users, by remote execution in a hosted or utility environment, or some creative compromise between the two. Versioning refers to either or both of: 1) switching between versions of a software asset, either upgrading or "downgrading" as needed, and 2) sorting out the sharing and prerequisite graph of a set of co-resident assets, where different assets may require different versions of a prerequisite. An "asset" refers to the closure of an application and all of its (non-OS) dependencies. E.g., if an application requires an external JVM (not part of the packaged application) for execution, the asset corresponding to that application must include a JVM. Servicing refers to both problem determination and the insertion of fixes and upgrades in a fashion least disruptive to the user.

In a pure hosted or utility approach, the problems discussed above have a commonly-used solution: important software executes on servers. Servers are typically specialized and thus have relatively few conflicts between co-resident assets. Software residing on servers is serviced and upgraded in a planned fashion by skilled personnel. This servicing and upgrading is labor-intensive, but, by aggregating execution in server farms, the hard work can be done once and then replicated across machines.

The hosted solution, however, does not work for all cases. Users often want to be able operate personal machines without continuous network connectivity. Large enterprises continue to demand the security and predictability that comes from controlling their own equipment. Unfortunately, when software is installed on user equipment, upgrading and maintenance becomes more difficult. For example, deployment involves a stop-and-wait install step, version switching is error-prone and version conflicts are common. Further, servicing is extremely labor-intensive because service personnel must spend considerable time understanding the idiosyncrasies of a user's install environment and collecting diagnostic information via an intermediary (the end-user) who lacks the skill to collect it. As a consequence, approaches to this problem have arisen, including auto-installation of software at first use and to auto-upgrading of software. Additionally, approaches to remote problem determination and versioning have arisen.

One approach commonly taken to the versioning problem includes: 1) accurately representing software prerequisite graphs, 2) ensuring satisfaction of dependencies at install time, and 3) imposing requirements on how components are permitted to evolve. If dependency and version information is accurate and the evolution rules strictly followed, there will be a least upper bound on the version of each component required to be maintained in the user machine. This methodology, however, can be error-prone. A complimentary technique includes isolating executing components such that multiple versions of a prerequisite component are permitted to co-exist. Isolation is implemented in various ways conventionally (e.g., Java class loaders, ".NET" assemblies), but its realization is seen to be heterogeneous and inconsistent when the software likely to be found on the user's machine is considered as a whole.

(A class loader, as described herein, refers to an object in the Java technology security model that is responsible for loading Java binary classes from a network into a local interpreter. A class loader keeps its classes in a separate namespace, so that loaded classes cannot interact with system classes and breach system security. ".NET" refers to a software technology available from Microsoft Corp. of Redmond, Wash. ".NET" provides network communication capabilities to applications during execution. A ".NET" assembly allows an application to access remote information.)

Therefore, there exists a need to overcome the problems discussed above, and, more particularly, a need to overcome the inefficiencies associated with deploying, updating and versioning software in a network system.

SUMMARY OF THE INVENTION

Briefly, according to an embodiment of the invention an information processing system includes a preparation machine with an installed image; an execution machine on which the installed image is virtually installed; and a virtualizer for virtualizing the installed image on the execution machine to produce a virtually installed image by using a hierarchy of selective virtualizers, wherein the virtualizing is selective such that not all operations of the executing software of the installed image at any particular level are virtualized.

According to another embodiment of the invention, a method for remotely interacting with an application executing on an execution machine includes steps or acts of: virtualizing an installed image from the application prepared on a preparation machine onto the execution machine to produce a virtually installed image; providing an interface for allowing a second application to interact with the emulating element; and receiving data from the second application for directing operation of the emulating element.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
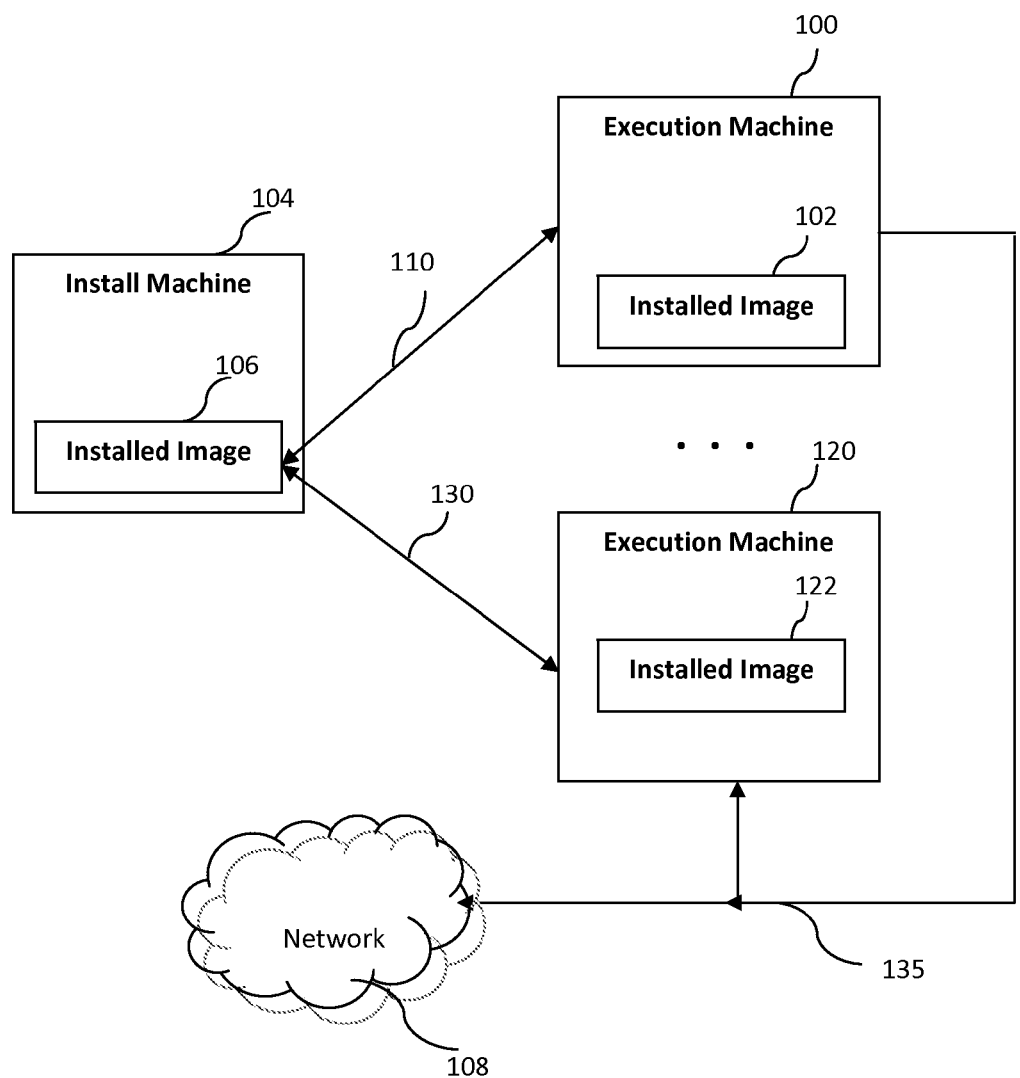
FIG. 1 is a block diagram showing the system architecture of a computer system implementing a conventional explicit install model and an implicit install model.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The present invention uses a hierarchical selective virtualization approach in which multiple semantic levels of an application are simultaneously virtualized for purposes of allowing the application to execute on a host execution machine. Semantic level refers to a nested virtual runtime environment for a programming model that is different from the host environment's programming model. Thus, for a Java application, there are two semantic levels, the "base level" which is the JVM code itself, written for the native platform, and the Java code running in the JVM's virtual runtime environment written for the Java platform. A virtualizer, as used herein, refers to a program or routine that emulates an aspect of a native environment for an installed image of an application. In one example, in the case of a Java application, two hierarchical virtualizers are present. One virtualizer selectively virtualizes the OS interfaces used by the native modules of the application, while the other virtualizer selectively virtualizes the JVM interfaces used by the Java interfaces of the application.

Figure 2:
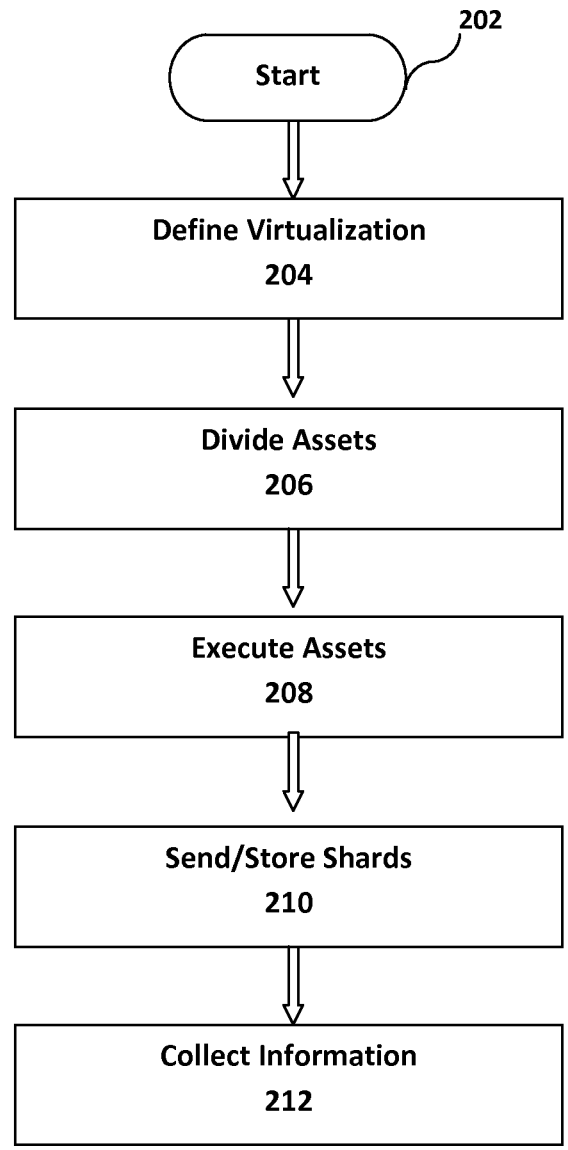
FIG. 2 is a flow diagram depicting the process control flow of one embodiment of the present invention.

Referring to FIG. 2, there is shown a block diagram of an information handling system 200 consistent with an embodiment of the present invention. For purposes of this invention, computer system 200 may represent any type of computer, information processing system or other programmable electronic device, including a client computer, a server computer, a portable computer, an embedded controller, a personal digital assistant, and so on. The computer system 200 may be a stand-alone device or networked into a larger system.

Virtualization is more complex to implement than image copying, but does not suffer from the same limitations. For example, virtualization enables an application's original installed environment to be dynamically created as an illusion that is specific to each executing instance of the application, without making any modifications to the actual execution machine's environment. As a result, there is no risk of leaving any residue in the execution machine environment in the event of an application or OS crash, or interference with pre-existing applications on the execution machine.

The present invention includes a hierarchical selective virtualization design, an indirectly mapped representation of the installed image, a cryptographic digest-based method of identifying installed image artifacts, a semantic paging Application Program Interface (API) that allows pluggable delivery subsystems for transporting installed image artifacts from persistent store to a local cache, and dynamic services injection technology.

In one embodiment, the present invention implements the software analogue of "Stock Keeping Unit (SKU) numbers" to uniquely denote the state of a software system for easier serviceability, provides the ability to build large "asset collections" containing supported system variants without incurring any storage redundancy, provides an image overlay capability that enables virtually installed images to co-exist with locally installed ones, provides the capability to verify the integrity of a virtually installed application with very low overhead, and provides the ability to dynamically inject tools into a running system for remote problem diagnosis and support. These features help address the serviceability problem of modern commercial software systems in addition to the administration problem. The present invention further addresses the problems of deployment, versioning, and servicing for software assets.

The present invention presents an approach to the deployment, versioning, and servicing of software executing on user equipment. The present invention virtualizes, or emulates, the operations that a software asset utilizes to load its code, metadata and configuration information. This virtualization is tailored to the needs of the software execution and therefore cuts across a number of well-known virtualization points such as virtual file (Input/Output) I/O demand paging, and dynamic loading. The resulting virtualization is both selective and hierarchical.

The virtualization described above is selective in that not all operations of the executing software at any particular level are virtualized. For example, file reading may be virtualized when code, metadata, or configuration information of the executing program is read. Reading of application input data that must originate from the local machine is not virtualized.

The virtualization described above is hierarchical in the sense that virtualization occurs where needed, wherein there can be more than one virtualizer active in a process. For example, a Java program can have its class loader operations directly virtualized, while other file I/O operations would be selectively virtualized at the file-system level.

The present invention further divides software assets into variable size, semantically-determined "pages," referred to as shards. A "shard" is the smallest granularity of representation of an asset's installed image. The choice of shard boundaries is determined by three factors. The first factor involves the virtualizer hierarchy. A natural shard granularity is determined by the needs of the virtualizer hierarchy. For example, virtualization of Java class loading suggests that each class be a shard while file virtualization suggests that each file be a shard.

The second factor involves efficiency. Shards may be further aggregated or disaggregated for reasons of efficiency. Larger shards amortize the cost of delivery. Smaller shards permit greater flexibility in overlapping shard delivery with program execution. Smaller shards also improve the likelihood that identical bit patterns will be recognized (see the third factor below). A lower bound on shard size is imposed by the virtualizer's semantic requirements. For example, there is an inefficiency associated with delivering only half the bytes of a Java method.

The third factor involves optimization. All other things being equal, shards are defined so that semantically identical shards are bit-wise identical. This optimizes the solution to the versioning problem (discussed below). For example, two executable code segments may be 99% identical but differ by a few timestamps. If the timestamp information is isolated in separate shards, then the shards containing the identical bits can be recognized as identical. Otherwise, this recognition can be much more difficult to effectuate.

The present invention further executes an asset, not a program requiring installation and configuration. An asset is an encoding of the installed image of an application, consisting of the shards corresponding to the application and the closure of its non-OS dependencies. While a typical program has dependencies and stores its configuration somewhere in the machine environment, an asset includes its configuration and most of its dependencies in the form of shards. The only dependencies that are not included are those that have been deliberately chosen to be part of the computer platform (generally, those items that come standard with the operating system).

The present invention provides sufficient isolation for executing software so that tracking of dependency and versioning information on the user machine is unnecessary (beyond checking the operating system version). To compensate for the high degree of redundancy that this implies, shards are kept in an associative backing store such that bit-wise identical shards are stored only once. The creation of shards in the first place takes this into account as much as possible (as described above).

The present invention further provides an associative backing store for a semantic paging system having a distributed implementation, thereby allowing multiple assets to be incompletely present on the user machine (though others may be present in their entirety to support disconnected operation). The local shard cache is fed by a remote shard repository that is authoritative for the asset. This shard delivery uses a mixture of "pulls" instituted by local cache misses and "pushes" based on predictive information about the asset's execution sequences. This shard delivery system results in virtually instantaneous and largely "pause-free" execution in a networked environment while not precluding disconnected operation once an asset becomes resident.

Unlike conventional file-system paging which is driven by I/O operations, the paging shards from the shard repository to the local cache is driven by the collection of virtualizers that are virtualizing different semantic levels of the executing asset. A virtualizer may prefetch some shards before they are actually needed for execution.

The present invention further includes integration of the execution of the installed image with the virtualizers (such that information can be collected efficiently about execution problems on the user machine) and with the associative backing store (such that information about assets and their versions can be collected).

FIG. 2 is a flow diagram depicting the process control flow of one embodiment of the present invention. FIG. 2 shows the process that occurs when an installed image is executed using the system of the present invention. The control flow of FIG. 2 begins with step 202 and flows directly to step 204. In step 204, the virtualization of the installed image is defined, wherein the hierarchy and the selectivity of the virtualization is characterized. As described in more detail above, virtualization is tailored to the needs of the software execution and therefore cuts across a number of well-known virtualization points. The resulting virtualization is both selective and hierarchical.

In step 206, the software assets of the installed image are divided into shards. As described in more detail above, the present invention divides software assets into variable size, semantically-determined "pages," referred to as shards. The choice of shard boundaries is determined by three factors.

In step 208, the software assets are executed. As described in more detail above, an asset is a closure of an application and all of its (non-OS) dependencies. The remaining shards of the asset are obtained by semantic paging. In step 210, shards are stored in an associative backing store for efficiency purposes. As described in more detail above, the local shard cache is fed by a remote shard repository that is authoritative for the asset. Alternatively, the shard repository can also be present on CD-ROM or any other storage medium. In step 212, as the assets are continue to execute, information is collected about execution problems on the user machine and about assets and their versions.

Hierarchical Selective Virtualization

Figure 3:
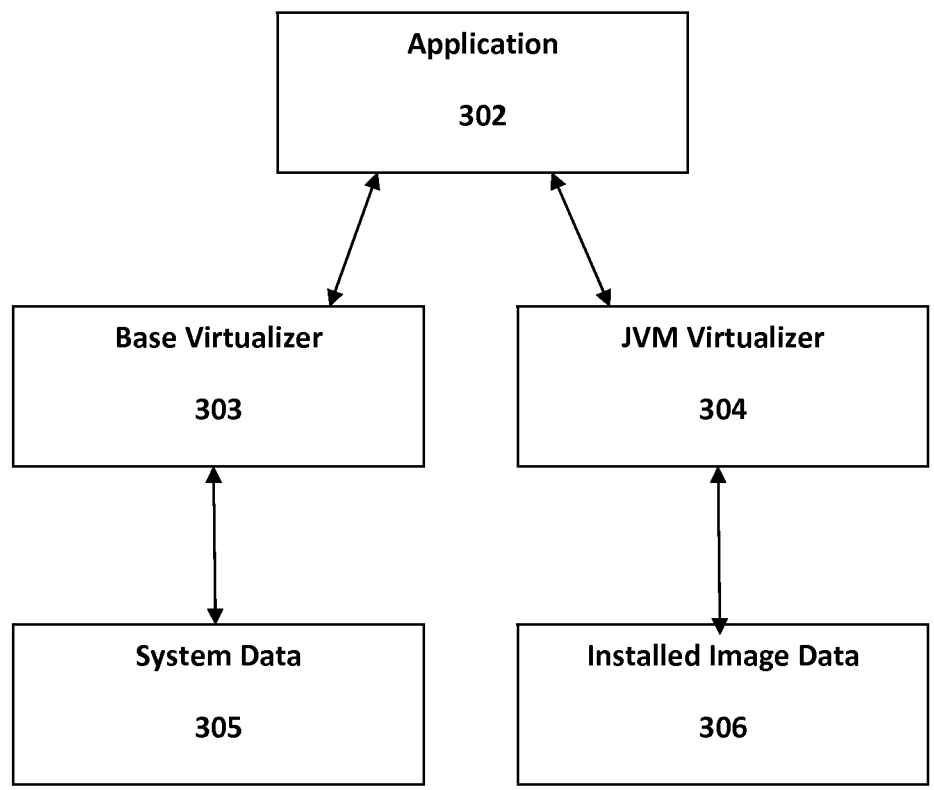
FIG. 3 is a block diagram depicting a hierarchy of selective virtualizers, in one embodiment of the present invention.

The present invention utilizes a hierarchy of selective virtualizers, each of which is responsible for partially virtualizing different semantic levels of the executing application. FIG. 3 is a block diagram depicting a hierarchy of selective virtualizers, in one embodiment of the present invention. For example, in the case of a Java application 302, there are two semantically distinguishable parts: a native part (consisting of native artifacts such as Dynamically Linked Libraries (DLLs), environment variables and registry entries), and a Java part (consisting of artifacts such as classes, resources, class loaders, system properties, and Java Archives (JARs)). Two selective virtualizers operate simultaneously in the address space of the executing application: a base virtualizer 303 that partially virtualizes the host machine's operating system interfaces, and a JVM virtualizer 304 that partially virtualizes the JVM's interfaces.

The two virtualizers operate together to provide a more flexible virtualization environment than just a single base virtualizer operating on its own, as illustrated by the following example. Consider a Java ClassLoader.loadClass( ) operation on the object foo.class (an equivalent operation exists for NET). The specific ClassLoader object responsible for this operation has an associated classpath consisting of a sequence of JAR files located in different places within the application's installed image. The semantics of the ClassLoader.loadClass( ) specify that the first foo.class found in this classpath should be loaded into memory from data 305 on the host system.

At the level of the base virtualizer 303, the application 302 will appear to be doing several file reads. The base virtualizer 303 will be able to determine that each of the reads is to a separate file (with a jar extension on some systems, though this need not be the case), but the base virtualizer 303 cannot know that this is a classpath lookup for a Java class object contained within a JAR file. The base virtualizer 303 therefore allows the file reads to occur, and ensure that each is properly redirected to the appropriate portion of the virtual installed image representation that contains the file data.

The JVM virtualizer 304 on the other hand can detect that the classpath associated with this ClassLoader object is entirely contained within the virtually installed image 306, which by definition is frozen at install time. The application 302 can therefore forgo the classpath lookup sequence and directly fetch foo.class from the virtually installed image 306, resulting in a performance gain. This optimization can be a significant gain in practice, and applications running from a virtually installed image often run faster than those that run from a normally installed image. Such an optimization cannot be done in the absence of semantic knowledge of Java level class loading operations.

Semantic Paging and Indirectly Mapped Asset Representation.

The internal representation of an application's virtually installed image is referred to as an asset. The asset is an encoding of all of the information required by the hierarchical selective virtualizer in order to execute a virtually installed image on a host execution machine. This includes the directory structure and file layout of the installed image, the entry points (executables) and arguments for starting the application, the environment dependencies (including registry entries in the case of Windows applications), system library dependencies, and dependencies on other applications. In the system of the present invention, the internal representation uses an indirect mapping technique that separates the byte content of installed image artifacts from their symbol names.

As described above, an asset consists of variable size, semantically-determined "pages" called shards. Shards are stored as pure byte arrays: they do not have names. Shards are identified by the cryptographically secure hash signature of their content. Cryptographically secure hashing algorithms have the property that bitwise identical content will have the same digest (hash signature). A separate structure called the manifest is used to keep the mapping between symbol names and shards.

Figure 4:
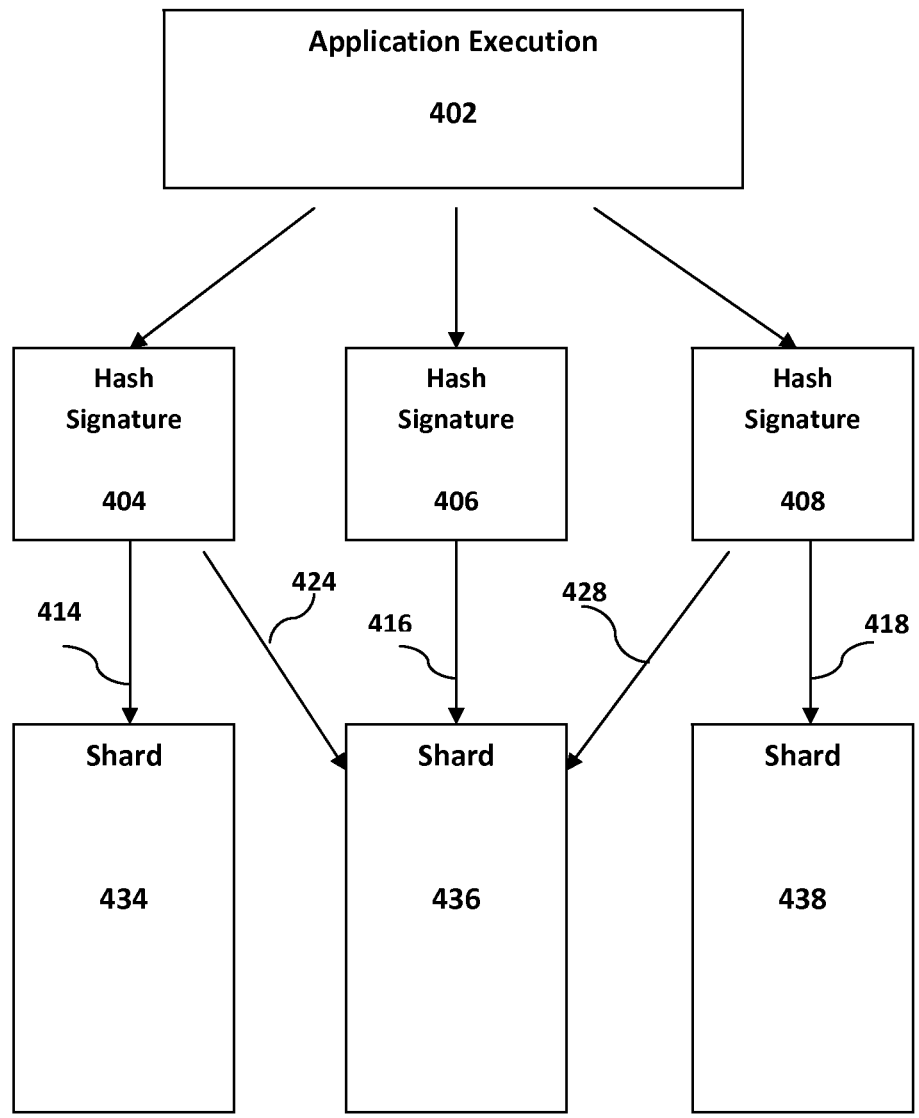
FIG. 4 is a block diagram depicting the indirect mapping process in one embodiment of the present invention.

FIG. 4 is a block diagram depicting the indirect mapping process in one embodiment of the present invention. FIG. 4 shows an execution of the application 402. Also shown in FIG. 4 is a group of shards 434, 436 and 438, each having a hash signature 404, 406 and 408, respectively. Note that each has signature includes a reference to a shard. Hash signature 404 references 414 to shard 434, hash signature 406 references 416 to shard 436 and hash signature 408 references 418 to shard 438. If it is determined that hash signatures 404, 406 and 408 are identical, then, shards 434, 436 and 438 are also identical. Thus, for efficiency and non-redundancy purposes, all but one shard can be erased. FIG. 4 shows that shard 434 and shard 438 can be erased. Then, hash signature 404 is redirected to reference 424 to shard 436 and hash signature 408 is redirected to reference 428 to shard 436.

This indirect lookup mechanism and digest-based scheme for locating the content associated with a symbol enables multiple symbols to map to the same shard. This allows shard sharing, which can reduce the redundancy in an installed image. Manifests themselves are represented as shards, identified by their own unique cryptographically secure digests. This fact allows manifests to be hierarchical structures themselves, enabling a semantic grouping of symbols. For example, symbols such as "URLClassLoader/Delegating-ClassLoader/com.ibm.research.foo.bar.class" are only meaningful to the JVM virtualizer, and are thus kept in a separate manifest from symbols referring to file names such as "/X/Y/Z/afile" which are only meaningful to the base virtualizer.

Semantic paging is a fundamentally different notion from file-system paging, because the page boundaries are determined by semantic and not structural requirements. Every virtualizer in the hierarchy of selective virtualizers can impose a corresponding semantically meaningful boundary during the conversion of an installed image into an asset representation. By contrast, file system page boundaries are determined by the file server and file system driver that need to cooperate in moving these pages over a network to reassemble the original files at the other end. The present invention further provides an interface for plugging different delivery subsystems for doing semantic paging over a network. This interface includes a mechanism for the executing asset to announce named program states or execution contexts, which can be used by the delivery subsystem to determine intelligent prefetch sequences in conjunction with any learning algorithm or profiling mechanism of its choice.

Asset Collections.

Multiple applications or even multiple versions of the same application can be represented in a single asset collection. The asset collection can have a separate manifest corresponding to each asset in the collection, but the shards will be shared by all assets in the collection. Asset collections offer a very compact representation of multiple versions of the same application, or families of related applications, since the redundancies within such a collection are likely to be plentiful. For example, an asset collection consisting of multiple versions of a web server application available to date can require less storage required by the sum of their installed images.

An advantage of asset collections is that the creator of an asset collection can map the shard digests, which are generally large numbers (e.g. 160 bits for one variant), to a small integer (referred to as the shard index in the preferred embodiment) based on an enumeration of the assets in the collection. A shard digest map can then be added to the asset collection, representing the mapping between cryptographic digests and shard indices. This can result in a compaction in the sizes of manifests. Additionally, the asset delivery system can be simplified by pre-determining that there are no redundant shards. Otherwise, the redundancy detection must be performed at the time shards of an asset are stored in the local shard cache.

Asset Mount Points.

By intercepting file system requests at a high level, we enable the files of a virtually installed image to appear anywhere in the host execution machine's file system view. Virtual files can even be intermixed with real files that exist in the host execution machine's file system view. By contrast, file system drivers are assigned locations by the operating system in the file system view, and so have more limited flexibility. As a consequence, the present invention support assets with rigid requirements on where asset files are placed, for example ones that require some files to be in system directories.

Asset Uris and Asset Serviceability.

Asset collections contain assets corresponding to families of related applications, such as all released and support versions of an application. Assets, and by extension their containing asset collection, can be identified by URIs (Uniform Resource Identifiers). Assets are immutable, and as such represent the exact state of an installed image. Any local modifications to installed image artifacts, such as configuration files results in the virtualizer doing a local copy-on-write of the modified artifact to a local shadow area, thus preserving the immutability of the asset itself. Thus, an asset URI can be viewed as a software analogue of a hardware Stock Keeping Unit (SKU) number that exactly identifies a unique hardware configuration.

SKU numbers allow both the configuration details and known idiosyncrasies and workarounds corresponding to a particular variant of the system to be documented and maintained in a support database. This enables support and services personnel to immediately call up known issues of a customer's installed system when troubleshooting a customer problem, without having to understand the set of patches and upgrades a customer has done to arrive at the current installed state. It also allows additional issues, as they become known through usage of that installed image in the field, to be added to the support database under the URI corresponding to that image.

The use of SKU numbers enables the vendor or a services organization to reproduce the exact installed image state of a customer, simply by pointing a virtualizer to the appropriate asset URI. This facilitates the serviceability of large software systems in the field.

Remote Services Injection.

The hierarchy of partial virtualizers executing an asset also provides an API for a trusted service point across the network through which logic that was not part of the asset (or its original installed image) can be injected into the executing application. This API can be used for performing remote problem diagnosis and real-time monitoring of the application. It can also be used to dynamically connect the application to hosted services across the network. The services injection mechanism is generic, enabling the service provider to connect to the base virtualizer instance on the customer's machine, and requesting it to load additional libraries into the application's address space. A separate thread of control is started by the base virtualizer at a specific entry point method in the service library. The injection of such a service is generally temporary, and the library can be unloaded and removed from the application's address space when desired.

An example use of service injection is when a customer submits a problem report to the service provider. The service provider may, for example, suspect a memory leak in the customer's web application server application. To establish whether this is the case, and to diagnose the problem further, the service provider may take multiple dynamic snapshots of the application's memory heap. The logic to take such a heap dump can be injected at the customer's request, and the service provider can remotely control it.

Exemplary Implementation.

We describe a detailed architecture specification of a preferred embodiment of the present invention.

Definition: an asset is a unit of software that is capable of being executed, corresponding to an executable plus its configuration information, extending to all the processes it creates and all the software and resources needed to support those processes. An asset contains the transitive closure of all of its dependencies except for the base operating system; thus, an asset is dependent only on the operating system.

Definition: a shard denotes an array of bytes stored on disk. The shard is the atomic unit into which all assets are divided by PDS, and it is the unit of sharing across assets. A shard is not self-describing and includes no meta-information: it is just bytes. The shards of an asset typically represent either files, discrete pieces of files (such as the members of archives), or convenient units of metadata. But, most generally, they can represent any information that supports the asset's execution.

Definition: an asset collection (AC) is a collection of assets including the union of the shards of all the assets in the collection. Within an AC there are no bitwise duplicate shards (and some shards may belong to more than one asset). The asset collection is the unit of preparation and deployment for PDS.

Definition: a shard source is a persistently stored information structure containing portions (all or part) of one or more asset collections. Within a shard source there are no bitwise duplicate shards (and some shards may belong to more than one asset collection).

Definition: a shard repository is a shard source whose asset collections are completely present.

1. Major Subsystems.

PDS can be divided into four major subsystems: preparation, delivery, execution, and service. The following high-level description covers what these subsystems do and how they interact.

Definition: a virtualizer is a component that intercepts some subset of an asset's communications with its supporting platforms such as the OS or a JVM. It redirects these requests so that significant resources are fetched from PDS instead of locally.

Definition: the base virtualizer (BV) is a distinguished virtualizer that manages the interfaces provided by the OS.

Definition: a shard execution cache (SEC) is a shard source that is read-only to virtualizers and contains the shards that the virtualizers need (not necessarily all the shards of any one asset collection).

Definition: a preparer is a software plug-in within the preparation subsystem that serves the needs of a specific virtualizer.

Definition: an asset initiator is the top-level executable of an asset.

Execution consists of running assets under virtualizers so that the asset is isolated from other assets. Virtualizers ensure that the asset gets enough of its resources from PDS so that it can execute without having gone through a local installation step. The execution of every asset begins by starting the asset's initiator under the control of the appropriate BV for the OS.

Significant platforms other than the OS (e.g., Java virtual machines) have their own virtualizers (which intercept and redirect interactions with the platform rather than with the OS). Thus, the execution subsystem maintains a (limited, shallow) hierarchy of virtualizers. The execution subsystem calls upon the delivery subsystem to ensure that shards needed by the virtualizers are available in the SEC. Preparation consists of breaking assets into shards, and organizing assets and their shards into asset collections. These asset collections are deployed into shard repositories. The preparation subsystem is "offline" and communicates with the rest of PDS only indirectly via the ACs that it produces.

The different virtualizers impose different requirements on preparation; thus, the preparation subsystem has an internal structure that allows different virtualizers to supply preparers within an overall framework that manages asset collections.

Delivery consists of moving bits between different shard sources with the goal of having them available in the SEC when needed by virtualizers. The execution subsystem announces its needs to the delivery subsystem to ensure that needed shards are in the SEC. The delivery subsystem may copy shards (if necessary) from a shard repository to the SEC (possibly via intermediate shard sources).

The PDS architecture regards the delivery subsystem as a pluggable component. The PDS architecture defines only the interface that delivery must offer to the execution subsystem. The delivery subsystem may degenerate to almost nothing if a shard repository is simply made available on the target system to serve also as the SEC. However, the PDS prototype will include one or more non-trivial delivery subsystem reference implementations.

The delivery subsystem is also responsible for security. It must permit PDS users to access only asset collections for which they are licensed (it may also provide finer grained access control). It must ensure that shards are not tampered with en route from one shard source to another. Service consists of additional features that can, with a user's permission, inject additional shards into the shard execution cache, and cause the execution subsystem to employ them in order to instrument the executing asset. The remaining subsections are as follows. First, we describe the PDS Information Model, which focuses on how PDS assets are organized and stored. Then, we describe the individual subsystems.

2. The PDS Information Model 2.1 Virtualizer Manifests and Meta-Shards.

Definition: a meta-shard is a shard containing meta-information generated by the preparation subsystem. This contrasts with a primary shard which is a fragment of an asset's original install image.

Definition: an (asset) virtualizer manifest (AVM) is a distinguished meta-shard that guides the behavior of a particular virtualizer with respect to a particular asset. An AVM may or may not contain all the relevant information for its virtualizer in a single meta-shard. It may simply be the root of a hierarchy of linked meta-shards.

Definition: the base (virtualizer) manifest (BVM) is the AVM of the base virtualizer for an asset. In addition to base-virtualizer-specific metadata, it also contains references to the AVMs of other virtualizers that the asset will need in order to execute. Thus, the hierarchy of virtualizers in the execution subsystem is mirrored in an AVM hierarchy rooted in the BVM.

The fact that the BVM/AVM hierarchy is stored in the form of meta-shards means that the delivery system deals only in shards and doesn't know anything about what those shards represent. The preparation subsystem nevertheless communicates meta-information to the execution subsystem via these meta-shards.

2.2 Asset Collections.

Definition: a shard digest is a digest of the bits of a shard using one of the algorithms in FIPS standard 180-2. The strength of the algorithm should be chosen so that, if the shard digest is used as a key to the shard itself, the probability of retrieving the wrong shard is no greater than the probability of a modem hard disk delivering the wrong sector.

Definition: a shard index (SI) is a positive integer the identifies a shard within an AC, without attempting to be unique across ACs. SIs are (nearly) densely assigned (small ACs use only small SIs). With variable-length encoding, small SIs occupy few bytes. The density of assignment does not have to be perfect. Every asset collection (AC) consists of the following. A URI that uniquely identifies the AC (its ACURI). For convenience in implementing shard sources, the ACURI syntax will use only characters that are acceptable in directory names. A set of shards, such that each shard in the AC belongs to one or more assets in the same AC and no two shards are bit-wise identical. Each shard is identified both by its shard digest and by its SI. The two kinds of ids serve different purposes. The digests help ensure that every shard is stored only once per shard source. The SIs provide small identifiers that can be used within AVMs to refer to shards.

An asset name map (ANM) for the AC. This map identifies the BVM corresponding to each asset name (using its digest or SI or both). A bijective shard digest map (SDM) for the AC. This map translates SIs into shard digests and vice versa.

During preparation, assets can be added to an AC and the AC can be freely modified. When the AC is ready to be exposed to the delivery and/or execution subsystems, its ACURI is published to a central registry and it is installed in one or more shard repositories. Once an AC has been published, its contents cannot change. A new AC may be issued, with a different ACURI, such that the new AC is an updated version of the old one. The two ACURIs may be chosen to express this versioning relationship. But, the already-published AC is immutable.

2.3 Absolute Asset Names

The combination of an ACURI (uniquely identifying an AC) and an asset name in that AC's ANM (identifying an asset within the AC), forms an absolute asset name (AAN). An AAN may be represented as a pair of strings or as a single string with a distinguished separator (exact syntax is TBD).

2.4 Shard Sources

A shard source is a logical structure that is stored persistently. The PDS architecture does not dictate the physical structure of a shard source, which may be stored in a variety of media using a variety of technologies (e.g., file system, DBMSs, specialized disk formats, etc). The shard source contains the following elements.

For each AC that is represented (all or in part) within the shard source

121 The ACURI. All or part of ANM for the AC.

All or part of the SDM for the AC.

Some or all of the shards from the ACs that are represented within the shard source. It is expected that shard digests will be employed to avoid duplicate storage of bit-wise identical shards when more than one AC is hosted. Additional meta-information needed by the delivery subsystem to manage the contents of the shard source (depends on the details of the delivery subsystem).

The delivery subsystem must be able to quickly identify the shard corresponding to a shard index of any of the ACs it is hosting if the shard is present. No matter what the actual storage medium is, the delivery subsystem must be able to make such shards appear as files (the virtualizers will either read them via file system interfaces or map them into memory). Furthermore, once any part of an AC is in a shard source (perhaps just its ACURI), the delivery subsystem has the responsibility to fetch remaining parts of that AC on demand. The delivery subsystem may also fetch entirely new ACs on demand.

2.5 Identifying Assets within ACs (Asset Browsing)

Within an AC, the shards of multiple assets are intermixed (and can be shared). So, how does one isolate the shards of an asset in order to inspect it, copy it, etc? The ANM identifies only one meta-shard (the BVM) for the asset. The BVM (and its dependent AVMs) are optimized for the needs of the execution subsystem, which typically does not need to find all the shards of an asset. But, PDS provides a way of navigating an asset which guarantees that all of the shards of the asset will be visited. It works as follows.

Every AVM format is associated with a Java class that implements a common Browsable interface. This interface represents the contents of any AVM via a generic tree model whose leaves are (usually) primary shards and whose interior nodes are (usually) meta-shards. The interface provides useful information about the shards and their relationship to the original asset. The BVM's implementation of Browsable can be instantiated on request, given an AAN (this gets looked up in the ANM of the appropriate AC to yield the BVM).

Every AVM format other than the BVM provides a factory that produces its implementation of Browsable for a given virtualizer entry in the BVM. One implementation of Browsable is the PDS browser utility, which can be used to inspect PDS assets within shard sources for informational and diagnostic purposes.

3. The Delivery Subsystem

The PDS architecture defines the requirements on its delivery subsystem so that a variety of implementations are possible. The architecture says little about how the delivery subsystem must be structured internally. However, we suggest a variety of possibilities in this section. The PDS prototype will supply at least two implementations.

3.1 Execution-Time Interface

The execution-time interface to delivery has two parts.

A callable Delivery SPI (DSPI) is invoked by the execution and service subsystems in order to ensure that particular shards needed by them are visible in the SEC. The SEC (shard execution cache) itself is selectively visible on the user's machine. Specifically, the shards that have been requested to be visible via the DSPI are made visible in the SEC as read-only files (possibly virtual). These files can be read using file I/O interfaces or mapped into memory. Whether or not other portions of the SEC are visible as files is not dictated one way or the other by this architecture. It is important that files appearing in the SEC are marked read-only at OS level, since the execution subsystem may rely on this degree of protection.

The Functions of the DSPI are as Follows. openCache—provides access to the delivery subsystem for an asset that is starting execution.

Inputs: the AAN of the asset that is about to start execution

A delivery license data structure. The details are dictated by the particular delivery subsystem implementation. The delivery license contains addressing and security information needed by the delivery subsystem in order to obtain the shards of the asset and determine if the caller is authorized.

A makeResident flag. The use of this argument is discussed under prefetch below.

Outputs: a cache handle that can be used for all further interactions with the DSPJ concerning this asset. This handle implies a particular AC (the AC whose ACURI was part of the AAN of the asset). Thus the combination of cache handle plus SI uniquely designates a shard (and shard digests are never passed across the DSPI).

the absolute path name of the shard in the SEC containing the asset's BVM.

In addition to returning the stated outputs, the openCache call begins a prefetch sequence which attempts to place the shards of the asset into the SEC before they're needed. The prefetch sequence can be further refined by additional SPI calls as discussed below.

getShardPath—provides an absolute path name to a shard within the SEC, and ensures the shard's presence in the SEC, so that the shard can be used by the executing asset.

Inputs:
a cache handle returned by an earlier openCache call.
a shard index defined within the AC implied by the cache handle (see openCache)

Output: the absolute path name of the shard or NULL if the shard is not defined within the AC or is not accessible to this user.

Note that getShardPath is called to ensure presence of every shard needed by an executing asset, except for the BVM meta-shard. Because the BVM's shard index is recorded in the ANM for the AC, it is found as a side-effect of opening the asset.

newContext—provides information to refine the prefetch sequence for the current asset.

Inputs:
a cache handle returned by an earlier openCache call
a string naming an execution context that the asset has just entered.

The meaning of context names is decided at the time the asset is prepared. Further details are discussed below under prefetch.

closeCache—invalidates a cache handle and cleans up associated resources

Input: a cache handle returned by an earlier openCache call

3.2 Prefetch

Prefetch refers to the delivery subsystem's anticipation of the needs of the execution subsystem. A prefetch sequence causes shards to be made visible in the SEC before such visibility has actually been requested via getShardPath.

Prefetch is technically an optional feature of delivery subsystem implementations. However, if a delivery subsystem would otherwise block execution while fetching remote shards, some form of prefetch may be required in practice to achieve adequate performance.

The prefetch sequence to use for a given asset would typically be learned by observing the asset's execution during a series of training runs. The sequence of shard requests will be highly stable during the early (initialization) phases of the asset. When the asset reaches its first extended idle period (i.e., a period during which no shards are requested), the learned prefetch sequence ends, after which the delivery subsystem may either halt the prefetch or continue prefetching until all of the shards of the asset have been fetched.

The openCache DSPI call instructs the delivery subsystem, by means of a makeResident flag, whether prefetch should stop at the end of the learned phase or continue until the asset is resident. A resident asset is one that requires no network connectivity in order to execute. If makeResident is specified, the delivery subsystem should continue fetching the asset even after the current asset execution ends, and should, if feasible, display a progress bar or other visible indication that the user can use to plan safe disconnection from the network.

It is also possible to have more than one learned prefetch sequence for an asset. Prefetch sequences other than the start-up one are associated with execution contexts which are assigned names during asset preparation. The DSPI newContext notifies the delivery subsystem that the asset has entered a new execution context.

When an asset has more than one execution context, the training process may consist not only of learning the sequence of shards needed in each context, but also the relative probabilities of transitions from that context to others. When the prefetch is done for a given context, the delivery subsystem can speculatively prefetch for likely successors. Only when no learned sequences are available does prefetch either stop or fetch arbitrary shards of the asset in order to make it resident (prefetch should always service the current execution context in preference to fetching shards solely because they are part of the asset).

A call to newContext must be made by a virtualizer, so a virtualizer must have some way to recognize that an asset is entering a new context. At present, the PDS architecture does not specify how virtualizers can automatically recognize execution contexts: this is expected to be an area of active exploration. In section 4.4.6, we describe how calls to newContext can come about in the course of virtualization.

3.3 Deployment of ACs

Every delivery subsystem must provide ways to create shard repositories and add ACs to existing shard repositories.

The PDS architecture does not dictate the details of this deployment interface, since it does not dictate the physical layout of a shard source. However, the PDS architecture does describe an AC physical format (ACPF) (see preparation subsystem for details). Delivery subsystems must accept ACs that are provided as ACPF archives.

ACPF permits multiple ACs to be combined in one information structure, so that the preparation subsystem can package multiple ACs together. The ACPF thus meets the definition of a shard source, and so, the ACPF represents one possible physical format for shard sources. In this format every shard is a file (possibly within an archive).

Shard files form a predictable directory structure based on shard digests so that shards can be found via their digest. Each AC in the shard source has a directory named for its ACURI, containing its (possibly partial) ANM and SDM. Both of the latter are stored as files. Thus, if the deployment subsystem uses the ACPF as its shard repository format, then creating a new shard repository is simply a matter of reserving a root directory and adding an AC to the shard repository can be accomplished using a simple algorithm that just unzips ACPF archives and copies files (checking for bit-wise duplicate shard files).

3.4 The Minimal Delivery Subsystem

The minimal delivery subsystem represents one way to configure the PDS prototype implementation. It is very simple to set up, but has some non-optimal performance characteristics.

Shard repositories use the ACPF.

The SEC simply is an ACPF shard repository. This may be locally copied or remotely mounted (read-only) using a distributed file system. In the latter case, it is assumed to be mounted in a stable place. In any case, the location of the shard repository is known at the time of asset launch and is recorded in the delivery license.

The DSPI is implemented as follows.

openCache uses the delivery license only to identify the path to the shard repository. It looks up the AAN by matching the ACURI against its AC directories and then matching the asset name in the ANM for the designated AC. The cache handle it returns encodes the path to the directory containing the AC.

The makeResident flag is ignored, since the asset is either local or remote by virtue of the kind of file system employed and this cannot readily be changed.

getShardPath uses the known structure of the shard repository to compute the correct path to a shard.

newContext is an no-op. This implementation does no prefetching per se.

closeCache only discards what was allocated by openCache 3.5 A Reference Delivery Subsystem The reference delivery subsystem is a second way to configure the PDS prototype implementation. It employs a servlet-based server. The goal is not scalability but rather exploration of important functions such as prefetch that cannot be easily accomplished with a conventional distributed file system.

The server has available to it a shard repository using the ACPF. The SEC is an area on disk owned by the reference delivery subsystem. It also uses the ACPF. It starts out empty.

The DSPI is implemented as follows:

openCache interprets the delivery license as server URL plus a session key. It initiates an HTTP dialog with the server. It passes the AAN to the server along with a flag indicating whether the asset should become resident. It then becomes receptive to shards flowing from the server.

Shards arrive from the server with meta-information including the shard index (relative to the AC specified at openCache time), the shard digest, and the bytes of the shard itself. These are placed in the SEC as they arrive.

getShardPath computes the path name within the SEC of where the shard should be. If the shard is there, the path is returned. Otherwise, a panic request is sent to the server, which will try to deliver the shard as soon as possible. The SPI call blocks until the shard is available, then returns.

newContext sends the context name to the server, which alters the sequence of shards it is sending accordingly.

closeCache closes the dialog with the server.

3.6 Toward an Optimal Delivery Subsystem

One of the challenges in the PDS project is to develop an optimal delivery system which has the scalability and performance of the best distributed file systems but with explicit functionality to support progressive deployment. Some characteristics are already present in some distributed file systems.

Special optimizations for read-only. Note that PDS only needs to read shards at execution time: it never writes them.

Support for disconnected operation. Some distributed file systems have this. Investigation will be required to determine how best to exploit this in delivering the makeResident functionality needed by PDS.

Programmable prefetch. Prefetching in conjunction with caching is a well-explored research area but general-purpose file systems lack semantic information needed to do prefetching effectively. Quite likely (literature review is TBD), there are some distributed file systems that have attempted to address this. Investigation will be required to determine how best to exploit these capabilities in delivering the kind of prefetch most likely to be useful in PDS.

Evolution to an optimal delivery subsystem may be a matter of starting with the reference delivery system and making it into a new kind of distributed file system. Or (more likely) it may be a matter of driving PDS-specific requirements into an existing distributed file system. Or, it may involve elements of both.

3.7 Security

The PDS architecture makes security the responsibility of the delivery subsystem. At a minimum, the delivery subsystem must do two things.

The primary shards of each asset contain code and data that would normally be loaded from a local disk. Existing security models that were presumed when applications were written would be violated if network-loading of shards resulted in opportunities for tampering that would not have been present otherwise. Thus, the delivery subsystem must prevent tampering of shards as part of its network protocols unless it is running entirely within a secure environment.

The primary shards of each asset contain code and data that are typically licensed to users or companies. In the simplest security model for PDS, each AC represents a unit of licensing. The delivery subsystem must not make ACs accessible to users who do not have the right to use them. The delivery license is passed on openCache for the purpose of performing authentication. The details of what is passed in the delivery license can be dictated by the delivery subsystem.

A delivery subsystem may optionally add value in the security domain beyond the obvious. For example, a delivery subsystem may support the creation of ACs in which assets are authorized to users individually (note that openCache technically opens only an asset, not the entire collection). This implies some complexity within the code of the delivery subsystem, thus we do not make it a requirement for all delivery subsystems.

4. The Execution Subsystem

The execution subsystem consists of a bootstrap, a set of virtualizers, an updater, and a framework for defining additional components called launchers.

Definition: an executing asset (EA) is an asset that has been activated by the PDS execution subsystem and thus occupies one or more running processes on a client machine.

The bootstrap is the activation point for PDS on any machine: it turns assets into EAs. It provides functionality equivalent to CreateProcess on win32 or fork/exec on UNIX, except that the executable path name is replaced by a PDS AAN and the supplied arguments and environment are merged selectively with ones that were built into the asset at prepare time. The bootstrap exits once the initial process of the asset has been started (under the BV).

Virtualizers (defined earlier and explained in more detail below) form a hierarchy and manage the actual execution of the asset.

The updater is a PDS program that updates the bootstrap, the BV, and itself, from a well-known PDS asset collection containing copies of PDS itself. The updater uses an older copy of the bootstrap, the BV, and (of course) itself to perform the update.

A launcher is any program that invokes the PDS bootstrap, after perhaps invoking the updater to ensure a new-enough version of the bootstrap and its dependents. Architecturally, launchers are consumers of PDS services and not a-part of PDS itself. But, PDS semantics dictate certain things that launchers must do and must know, which are also dealt with in this section. A useful PDS implementation will come with some pre-packaged launchers.

Since the execution subsystem is the primary PDS presence on a client machine, we first describe what it means to install PDS.

4.1 Installing PDS

When PDS is installed, the following happens.

A directory is reserved and its path is stored in the environment variable PDS_HOME.

A subdirectory of % PDS_HOME % is reserved to hold PDS binaries.

The minimal required subset of the delivery subsystem is installed, according to the delivery method chosen (see section 3 delivery subsystem above). At least the part of this software that implements the DSPI will be under % PDS_HOME %. Other parts of the software may reside elsewhere (for example, code may be installed as a file system driver or other system extension). The PDS reference implementation of delivery resides entirely under % PDS_HOME %.

The minimal required subset of the execution subsystem is installed in the binary directory.

This consists of the prepackaged launchers (or these may be installed elsewhere, depending on what they do).

The bootstrap.

The base virtualizer.

The updater.

Other PDS binaries, including the binaries of non-base virtualizers, are served via PDS and need not be installed.

A subdirectory of % PDS_HOME % is reserved as the shadow area to hold data written by EAs. The shadow area is discussed in section 4.4.4 below.

For some delivery methods, a subdirectory is reserved to contain the SEC. For other delivery methods, the SEC may simply be a local or remotely mounted shard repository and would not necessarily appear under % PDS_HOME %.

For delivery methods that have a locally-managed SEC, installation may include partly pre-populating that SEC with useful PDS assets. These will typically include PDS utilities which are assets within PDS-defined asset collections. For delivery methods that use a local or remotely mounted shard repository, these generally useful assets are typically present in the repository.

4.2 The Bootstrap

There is a distinct bootstrap for each OS. The current architecture defines the bootstrap for win32. It is anticipated that the bootstrap for Linux will have similar functionality but will substitute exec and its semantics for CreateProcess, and may have other minor differences.

Definition: a qualified path name (QPN) is either an absolute path name (e.g. c:foobar.dll) or an environment variable reference followed by a path separator followed by a relative path name (e.g. % SYSTEMROOT % bar.dll). The environment variable must designate a directory by absolute path name and must be a variable that is always defined on every machine, either because it is mandated by the OS (e.g., % SYSTEMROOT %) or because it is mandated by the PDS installation (e.g., % PDS_HOME %).

The bootstrap's single entry point takes the following parameters.

The AAN of the asset to be executed.

A delivery license to be passed on to the delivery subsystem. This consists of whatever the delivery subsystem needs to make an asset available, including server address information and security-related information. See delivery subsystem for details.

A becomeResident flag to be passed to the delivery subsystem.

A command line, as in CreateProcess.

An environment, as in CreateProcess.

A current directory, as in CreateProcess.

The bootstrap performs the following steps.

It passes the first three arguments to the delivery subsystem's openCache method via the DSPI. The delivery subsystem may not be able to resolve the AAN or may refuse to enable the asset for the present caller, in which case the bootstrap passes this failure back to its caller without creating any new process. As a result of a successful call, the bootstrap has a cache handle and the path name of the BVM for the asset.

It activates the BV within the current process (still the process that invoked the bootstrap). The BV reads the BVM to establish OS-level interception. However, the bootstrap code is able to see the in-memory copy of the BVM as well, in order to carry out the next step.

The bootstrap gets the QPN of the asset's initiator module from the BVM and resolves it to an absolute path name. This is a DLL containing the asset-specific initiation logic (see preparation subsystem). The initiator is loaded via LoadLibrary, but, since the BV is active it ends up redirecting this call (see base virtualizer below) so that the initiator is actually fetched by PDS.

The bootstrap calls the initiator's main entry point, passing the command line, environment, and current directory as arguments. Typically, the initiator will process these arguments, merging information in them with information built into the asset, before starting the asset's first "real" executable via CreateProcess. Again, since the BV is active, it ends up redirecting all of the initiator's system calls, so the first "real" executable is also fetched by PDS.

At this point, the bootstrap returns to the launcher, which will typically exit.

4.3 Standard PDS Virtualizers

PDS comes with at least two virtualizers and a framework for adding more virtualizers as platforms above the OS level are identified that deserve their own virtualizers. As of this writing, PDS has a base virtualizer which is always present and a JVM Virtualizer which is brought in by any asset that uses the Java platform.

4.4 The Base Virtualizer

There is a distinct BV for each OS. The current architecture defines the BV for win32. It is anticipated that the BV for Linux will have similar functionality but may be structured differently.

PDS divides the win32 API into intercepted functions (ones that are redirected by the BV) and non-intercepted functions (those that are passed unmodified to the OS). Below, we categorize the intercepted functions semantically and explain what PDS does within each category. But, first we explain the mechanics of interception.

4.4.1 Mechanics of Interception

Definition: A DLL that is provided with the OS and therefore not part of any asset (but which may be used and depended upon by assets) is called a system DLL. For a given OS version, it is possible to enumerate the system DLLs.

Definition: A system DLL that exports any of the intercepted functions is called a fronted DLL. As of this writing, kernel32.dll is the only fronted DLL, but that may change.

For each fronted DLL, we provide a PDS dispatcher DLL. This DLL exports functions that exactly mimic the names and signatures of functions in the fronted DLL. It is built entirely from linker directives that forward the functions. The non-intercepted functions are forwarded to the fronted DLL. The intercepted functions are forwarded to the PDS interceptor.

Every executable (exe or DLL) that runs under the BV will be patched so that each reference to a fronted DLL is replaced with a reference to the corresponding dispatcher DLL. The patching process is explained in section 4.4.5.2 below.

The PDS interceptor contains the code to actually handle intercepted functions. It can freely call fronted DLLs without being recursively redispatched a second time (i.e., it is exempted from the previous item).

4.4.2 Categories of Interception

The BV intercepts functions in the following categories.

File system functions are the largest and most important set and are discussed in the next subsection.

Process creation and dynamic loading functions would be intercepted in any case as a consequence of file system interception (since executables are files), but there are additional issues at process creation time and load-library time that are covered in a subsection below.

Registry functions are intercepted so that the asset may see (and may even create) virtual registry entries that are not in the actual system registry (even though they are not in the system registry, they can still be stored persistently, so that they are seen by successive executions of the asset). Registry support is not discussed further in this overview.

4.4.3 The Base Virtualizer Manifest (BVM)

Definition: a PDS filesystem (PFS) is a directory/file tree that is made visible to an EA by the BV but is not visible to processes outside the EA.

Definition: a Filesystem Manifest (FSM) is a distinguished meta-shard that describes a PFS.

Provision is made for the FSMs of large PFSs to be segmented, so that they can be brought in as a series of linked meta-shards instead of all at once.

Definition: a PDS mount point is a QPN designating the apparent directory that is the root of a PFS as seen by the EA.

Definition: a virtualizer stub is a DLL that contains certain standard functions provided by every non-base virtualizer. These are the functions that the BV will need to execute in order to ensure that the virtualizer gains a foothold in the loaded executables belonging to the virtualizer's target platform (e.g., JVM executables in the case of the JVM virtualizer).

The use of % PDS_HOME %-based mount points is encouraged when the apparent location of the PFS does not matter, because the physical directory structure under % PDS_HOME % is reserved for PDS and cannot conflict with any significant local filesystem.

On the other hand, when the location of the PFS is fixed by the semantics of the asset, an absolute path name or a path relative to % SYSTEMROOT % or any other OS-mandated environment variable can also be used.

The BVM provides the necessary metadata to the BV. It contains the following elements.

The QPN of the asset's initiator. The asset initiator is responsible for programmatically establishing the environment, command line, and current directory of the initial process of the asset.

Zero or more PFS definitions. Each definition is a pair, consisting of a mount point the shard index of an FSM for the PFS All PFSs defined in the BVM will appear as virtual file systems to the EA.

Zero or more virtual registry entries that are to be made visible to the EA without entering them into the actual system registry.

Zero or more definitions of other virtualizers to be activated. Each definition is a triple consisting of the virtualizer name (a string).

The QPN of the virtualizer stub for this virtualizer.

A string argument (called the virtualizer cookie) to be passed to the virtualizer stub.

More information about virtualizer stubs is presented below in the discussion of process creation.

4.4.4 File System Interception

The main effect of PDS's file system interception is to supply PFSs to the EA. The PFSs contain the code of the asset and all of its configuration information and other dependencies. PDS is tuned for the assumption that PFSs are "read-mostly" areas. However, provision is made for assets that write into their PFSs, either by creating new files or by modifying some existing configuration files.

Definition: a PFS's shadow is an area maintained by PDS under % PDS_HOME % in which are stored any files created or modified within the PFS by one or more EAs, and any registry entries created by EAs during their execution.

All files in shadows are stored persistently. If the same asset is executed repeatedly, later incarnations will see files stored into shadows by earlier ones. If two EAs using the same shadow are active at the same time, they will see each other's activities in real time.

Thus, assets are isolated from each other but not from simultaneous incarnations of the same asset.

4.4.4.1 File System Manifest (FSM) Contents

For each directory or file in the FSM, the FSM supplies some of the original metadata for the file or directory as it existed at the time the asset was prepared. Some of the less-used metadata may be relegated to secondary meta-shards. Metadata that is more appropriately reconstructed in the target machine as part of the virtualization is not stored in the FSM.

In addition, the FSM indicates whether the file or directory is writeable (regardless of whether its system metadata says that it is writeable). As mentioned above, we assume that PFSs are "read-mostly" and so relatively few writeable files or directories should be present. PDS will regard it as an error if an asset modifies something in a PFS that is not marked writeable.

If the path denotes a file, the FSM supplies the SI of a shard containing the file's contents.

If the path denotes a directory, FSM either lists the directory's contents or provides the SI of a meta-shard containing the directory's contents.

In addition, the FSM assigns two global attributes to a PFS, transparent, and scope.

transparent is a Boolean value indicating how the PDS interceptor should deal with the possibility that the mount point for this PFS overlays an actual directory in the local file system. If transparent is false, PDS will make all the real files and directories underneath the PFS's mount point invisible to the EA.

If transparent is true, the interceptor will merge the PFS with the local directory/file tree so that files and directories from both are potentially visible. Directories are merged. Files from the PFS take precedence over (hide) files from the local file system if (but only if) they have the same exact path name.

The transparent option is expected to be used when the PFS's mount point designates a well-known system area and the asset needs to map files into that area (or even let the asset write files into the area) without rendering the entire area invisible to the EA and without letting the EA actually modify the area.

Note that if a PFS is transparent and has some files that are writeable, it is possible that up to three versions of those files may exist: the original file from the local file system, the same-named file from the PFS supplied by the asset, and a modified version of the same file residing in the shadow. The last of these takes precedence within the EA, if it exists. But, the original file from the local file system is still what processes outside the EA will see.

scope is a string-valued attribute of a PFS that may be absent or it may be a URI. If it is absent, then the PFS's shadow is private to the asset and will not affect other assets, even if they have a PFS at the same mount point. If scope is a URI, then the PFS's shadow is shared with other assets that have PFS's at the same mount point with the same scope URI.

In effect, assigning a scope to a PFS creates an area that is shared between assets (which would otherwise be isolated from each other). This area is still invisible to assets not using the scope, and to processes that are not virtualized by PDS. This becomes a new tool available to asset preparers in organizing software into assets. One use of the scope option is to support migration between assets that represent different versions of the same program, when that program writes configuration information into a PFS.

We expect scope URIs to administered similarly to ACURIs. Suppose an organization issues a series of ACs containing successive versions of an evolving set of assets, some of which write configuration information into their PFSs. The organization can also define a scope URI that allows configuration information written by an earlier version of a program to be read and updated by a later version in a later AC.

The scope mechanism relaxes the asset isolation that is otherwise enforced by PDS. It induces a tradeoff, since a less perfect isolation may make it harder to roll versions of a program forward and back at will. At the same time, a too-perfect isolation makes it hard to carry forward important metadata.

Note that scope URIs are not the only sharing mechanism possible across assets. If assets save configuration information in purely local directories, the information is shared automatically because PDS does not virtualize those directories.

4.4.4.2 Intercepting Path-Directed Requests

Definition: a path-directed request (PDR) is an intercepted win32 API function that has at a path-name argument to designate which file or directory is intended.

Definition: a handle-directed request (HDR) is an intercepted win32 API function that employs a file or directory handle. This handle was previously "opened" to a file or directory by means of a PDR.

PDS's file system interception strategy is designed to intercept only PDRs. Some intercepted PDRs end up returning handles, but such handles are obtained by re-issuing the original PDR to the OS after substituting a different file or directory. The subsequent HDRs using these handles are not intercepted by PDS.

Definition: a resolved mount point (RMP) is a mount point whose environment variable, if any, has been replaced by its value on the local system. An RMP is the locally significant absolute path name of a mount point.

The RMPs of an asset can be computed eagerly at the time the BVM is read. The interceptor then uses the asset's RMPs to decide whether a PDR should be redirected or not. Recognizing that a path name falls inside an RMP is accomplished as follows.

The interceptor tracks all calls that set and return the current working directory (CWD), so that the EA's view of the CWD (the virtual CWD) need not necessarily be the same as the OS's view (the real CWD). More specifically, if the virtual CWD or a prefix of its path coincides with an RMP, the real CWD is left at its previous value; thus the virtual and real CWD will differ. This is necessary, since the OS will not permit setting the CWD to a non-existent directory.

Otherwise (the virtual CWD falls outside of any RMP) the real CWD is set equal to the virtual CWD.

All path names appearing in PDRs are absolutized (if not already absolute) using the virtual CWD. The result is an absolute path name.

The absolute path name in (2) is compared with the set of RMPs for the asset to see if it falls within any of them. If it does, the applicable PFS, and its FSM, have been identified and are used in the redirection. If not, the PDR is not redirected and is passed through unchanged to the OS.

The actual redirection of a PDR proceeds as follows (note: this is an operational model of correct behavior, not a prescription for the actual implementation, which may optimize processing by caching information in memory, etc.).

The path with the RMP stripped off is looked up in the FSM, resulting in one of the following cases.

An existing file is denoted (may be read-only or read-write access, with any level of sharing).

An existing directory is denoted (non-destructive directory level operation).

A new file or directory is to be created in an existing directory (perhaps creating some intermediate directories if that is legal for the operation), or a file or directory is to be deleted or renamed.

A "no-such-path" condition.

A semantic error (file operation on directory, directory operation on file, etc).

When an existing file is denoted, the writeable property in the FSM is checked.

If writeable=false, the shard in the SEC corresponding to the file is used directly for the request. This has been marked read-only by the delivery subsystem, so, in fact, any modification requests will fail.

If writeable=true, the shadow for the PFS is locked while the existence of the file in the shadow is checked.

If the file exists in the shadow, the lock is released and the file is used.

If the file does not exist in the shadow, the file (shard) is copied from the SEC to the shadow, then the lock is released. The copy in the shadow is marked writeable and is used for the request.

By requiring that writeable resources are always manipulated in the shadow regardless of what level of access or sharing is requested, we simplify sharing and access control logic, leaving all such matters to the OS.

When an existing directory is denoted by the path and the operation is a non-destructive, the operation is carried out entirely by the interceptor, using the FSM and (if the PFS is transparent) the corresponding local directory.

When the path in a PDR denotes a new file or directory being created in an existing directory (according to the FSM), the writeable property for the directory is checked in the FSM.

If writeable=false, the request fails.

If writeable=true, the shadow for the PFS is used as the directory for the new file or directory being created.

The same logic is done for renames, deletes, etc. A rename is decomposed into a delete and a create. A delete of something that was already present in the PFS requires writing an "anti-file" into the shadow.

In the no-such-path case, handling depends on whether the PFS is transparent according to the FSM.

If transparent=false, the no-such-path condition is handled just as with a semantic error (6).

If transparent=true, the existence of files and directories in the local file system are considered in re-classifying the request into one of five basic types as in (1).

If the result is an error condition, including no-such-path, it is handled as in (6).

If the request is found to be a non-destructive directory operation, it is passed on to the OS to be carried out.

If the request operates on an file, that file is copied to the shadow under a lock as in 2.b.ii and the operation is carried out there.

If the request creates or deletes files or directories, it is carried out in the shadow as in 4b.

As iii and iv indicate, if there is no information from the FSM as to whether something is writeable, we presume that it is. This conservative assumption ensures that no resources in the local file system that underlie a PFS can be altered by the EA.

Semantic errors are returned to the requestor as the appropriate sort of error or exception for the particular request.

4.4.5 Intercepting Process Creation and Dynamic Loading

Intercepted API functions involving process creation and dynamic loading are also PDRs as defined in the previous section because these calls designate a file containing an executable. So, typically, the executable images are actually PDS shards and are read from the SEC.

In addition, however, several special issues arise with process creation and dynamic loading which are addressed in this section. Because process creation is the more complex of the two and builds on dynamic loading, we consider dynamic loading first. Dynamic loading, in turn, makes use of a search path for executables, which must be virtualized.

It is important to clarify up front that while normal file system requests are redirected only if they fall within PDS mount points, the BV intervenes in all process creation and dynamic loading requests. The reasons are clarified below.

4.4.5.1 Virtualizing the Search Path for Executables

Definition: the search path for executables (SPE) is the sequence of directories that are searched for executables when a dynamic load or process creation occurs and the path name given to the request is not fully qualified.

The exact sequence of directories varies according to the type of request, the setting of certain registry entries, and the previous history of win32 API calls in the process. But, for any given request, the SPE is well defined.

Definition: the application load directory (ALD) is the directory from which the primary executable of a process was loaded.

The ALD is significant because it is the first directory in the SPE unless that characteristic is overridden by a special option of LoadLibraryEx. The ALD is also the location where the OS looks for a *.local (Dll redirection) file, which alters the handling of dynamic loading even for DLLs with complete path names.

Definition: the system directories are OS-supplied (non-PDS) directories that are part of the SPE.

Without being too precise about the order and other details, it is fair to say that the SPE is constructed from the ALD, the CWD, the system directories, and the PATH environment variable. Certain specialized facilities of the OS (LoadLibraryEx, SetDllDirectory) can cause the ALD or CWD to be replaced by other directories.

Definition: the virtual SPE is the SPE as viewed by the EA. It is made up of virtual entities such as the virtual ALD, the virtual CWD, and directories in the PATH that fall within PDS mount points, as well as real entities (the system directories, and directories in the PATH that don't fall within PDS mount points).

The BV maintains an accurate image of the virtual SPE by tracking all of the entities that can affect it, such as the virtual ALD, the virtual CWD, etc.

Definition: the real SPE is the SPE as viewed by the OS. It is made up of real entities such as the real ALD, the real CWD, the system directories, and those directories in the PATH that actually exist.

The BV endeavors not to let the OS see any requests for which the real SPE will matter, because it is very difficult to make the real SPE conform to what is needed by the EA once all the other interventions of the BV are taken into account.

In order to ensure that the real SPE will not matter, the BV must intercept all process creation and dynamic loading requests, including implicit loading of DLLs by executables that import from those DLLs. It must also ensure that the real ALD does not include a *.local (DLL redirection) file. This is described in detail below.

4.4.5.2 Suppressing Implicit DLL Loading, Patching of Import Tables

The BV alters the import/export relationships between executables by changing the names of DLLs that appear in the import tables of other executables. The function names and signatures are not changed. There are two distinct motivations for this.

As was previously described under 4.4.1 mechanics of interception, PDS depends on being able to replace references to fronted DLLs with references to the corresponding dispatcher DLLs.

While this can be done statically at preparation time for executables that are part of the PDS asset, it must be done at runtime for executables that are loaded from the system directories. For example, msvcrt.dll in the system directories imports from kernel32.dll, which is a fronted DLL.

Loading a DLL is a read-only operation and so the normal logic of file system interception would cause the DLL to be loaded directly from the SEC. However, in the SEC the DLL has an arbitrary name assigned by the delivery subsystem and not the name recorded in the import table of other executables.

Although the two motivations are different, the mechanics of patching is the same. At the same time, the technique employed guarantees that no implicit DLL loading (which would search the real SPE) ever occurs. Instead, the BV does explicit DLL loading by exact path name, bypassing the SPE.

The steps of the patching technique are as follows.

A dynamic loading request is intercepted by PDS or occurs as the result of executing this (recursive) algorithm.

The executable named on the request (hereafter called the target executable) is loaded using LoadLibraryEx with the DONT_RESOLVE_DLL_REFERENCES flag, suppressing the system's normal implicit loading of other DLLs.

For each DLL that is named in the import table of the target executable, the BV performs these steps. The DLL named in the import table is called the imported DLL throughout the balance of this description.

The directories of the virtual SPE are examined one by one for the existence of the imported DLL.

Real file existence tests are used within directories that are not in PFSs.

The FSM is consulted for directories in PFSs.

As a result, the actual imported DLL that would be implicitly loaded (had the system been allowed to load it) is identified.

If the imported DLL identified in step (a) is a fronted DLL as defined in section 4.4.1, the target executable is patched so that the name of the fronted DLL is replaced in the import table by the name of its dispatcher DLL (Otherwise) if the import DLL is found in a directory that is not in a PFS if the DLL is already in memory, nothing more is done.

Otherwise, this algorithm is recursively executed with the import DLL as the target executable. This is done only to find fronted DLLs, since references to PDS asset DLLs should not occur in DLLs loaded from outside PDS.

No change to the import table of the target executable is needed when a non-fronted import DLL is found outside any PFS, since its name is not virtualized.

(Otherwise, the import DLL is in a PFS).

For each non-base-virtualizer with an entry in the BVM, a call is made to the virtualizer stub for that virtualizer, passing the import DLL's path name, and getting back a possibly modified path name. Virtualizer stubs are explained more thoroughly below. The modified path name is used in the remainder of step d.

The shard containing the DLL is identified.

If the DLL with the shard's path is not yet in memory

The DSPI is called to ensure presence of the shard in the cache

This algorithm is recursively executed with the cached shard as the target executable The target executable is patched so that the name of the import DLL is replaced in the import table by the name of the shard.

As all DLLs were actually loaded with import resolution suppressed, the system must now be asked to complete resolution with the altered names, and invoke all the DLLmains of the loaded DLLs. It is not completely clear how to do this. Perhaps PDS will have to do these steps manually.

At the end of this algorithm including all recursive executions, the effects of implicit DLL loading have been simulated by explicit DLL loading and patching. DLLs that are supposed to come from PFSs will have done so, and references to fronted DLLs will be replaced by dispatcher references.

Several speed-ups of this algorithm are possible.

All executables that are part of the PDS asset can be visited at preparation time. References to fronted DLLs can be replaced with references to the corresponding dispatcher and the result saved back to disk. This saves some time at runtime and, more importantly, cuts down on the number of DLLs that end up being patched dynamically, which improves paging performance since an unmodified DLL will be paged from its original location on disk.

The BV can maintain a list of system DLLs that are known not to import (directly or transitively) from any fronted DLLs. For these, recursive execution of the algorithm in step 3c can be avoided, which speeds up the overall algorithm.

4.4.5.3 Special Considerations for CreateProcess

The previous section covers the behavior of intercepted LoadLibrary and LoadLibraryEx requests, but much of the import table patching logic is applicable to process creation as well. Handling of process creation is a superset of what is described in the previous section. The following steps are carried out whenever a CreateProcess call is intercepted.

If the ApplicationName parameter is NULL, the effective executable is determined by searching the virtual SPE using the first token from the CommandLine parameter as in step 3a of the previous section. Otherwise, the effective executable is determined from the ApplicationName.

If the CommandLine parameter is NULL, it is set equal to the ApplicationName.

If the environment parameter is NULL, it is set equal to the current environment.

For each non-base-virtualizer with an entry in the BVM, a call is made to the virtualizer stub for that virtualizer, passing the ApplicationName, CommandLine, and environment and getting back possibly modified copies of all three. Virtualizer stubs are explained more thoroughly below.

A new process is created, using the PDS process creation stub (PCS) as the executable.

The PCS is part of the BV and hence is located in the binary directory under %PDS_HOME%. This ensures that the PDS binary directory is the real ALD of every EA process. By ensuring that there is no *.local file in the PDS binary directory, we ensure that there is none in the real ALD, helping us ensure that the real SPE has no effect.

The CommandLine and environment are as established in steps 2-4.

The real CWD is inherited, guaranteeing that it exists.

The process is created with the CREATE_SUSPENDED flag, so that the BV can initialize the new process with the ApplicationName as computed in steps 1 and 4, the virtual CWD, the BVM location, and other critical pieces of metadata.

After the critical pieces of data are passed, the process is started so that the PCS can execute.

The PCS finishes initializing the BV in the new process.

The PCS loads the executable designated by Application name, which causes the algorithm of section 4.4.5.2 to be executed (since the PCS is running with the BV active and initialized in the new process). This causes all the import tables to be properly patched.

The PCS invokes the process initialization logic of the service subsystem (described later).

The PCS sets up the registers and jumps to the real entry point of the executable as if the executable had been directly set up by the OS.

4.4.5.4 Virtualizer Stubs

As noted in 4.4.3 Base Virtualizer Manifest, the BVM contains the definitions of virtualizers to be activated, where each is a triple consisting of a name, a cookie, and a virtualizer stub DLL.

As noted in the previous two sections, these entries are processed as part of every intercepted LoadLibrary and CreateProcess call. Here we explain more fully what are the rights and responsibilities of a virtualizer stub.

Each virtualizer stub DLL must export three functions, whose signatures are as follows.

TABLE-US-00001 extern char* modifyExec(// return allocated memory or NULL if none char* cookie, // The cookie from the BVM char executable, // Full path name of main executable designated for the new process char cmdline, // The Command Line from the intercepted CreateProcess char** env // The environment from the intercepted CreateProcess); extern char* modifyLoad(// return allocated memory or NULL if none char* cookie, // The cookie from the BVM char* parent, // The executable whose import table is causing the load, or NULL // if the load is explicit char** executable, // Full path name of executable about to be loaded); extern void freeStubMemory(char* memory);

The executable, cmdline, and env arguments of modifyExec are pointers to pointers to immutable string representations of the corresponding CreateProcess arguments.

The executable argument of modifyLoad is a pointer to a pointer to an immutable string representation of the FileName argument to LoadLibrary or LoadLibraryEx.

The modifyLoad call occurs either during an intercepted explicit invocation of LoadLibrary or LoadLibraryEx, or during a LoadLibraryEx that is being done in lieu of an implicit DLL load during the patching of an executable.

In all cases, arguments have been canonicalized so that the executable is always a complete path name and the cmdline and env arguments are never NULL.

In the case of the UNICODE version of intercepted calls, wchar_t* values from the original calls are converted to UTF-8.

If modifyExec or modifyLoad functions choose to replace any or all of executable, cmdline, and/or env, they can store a new char* into the corresponding char** argument. The supplied strings must not be mutated. Typically, some or all of the old value of cmdline or env will be copied in creating the new value.

If either of these functions allocates any heap storage in order to supply new values for its argument(s), it must returns the address of this storage. The BV shall eventually call freeStubMemory to free such storage. If modifyExec or modifyLoad allocates no storage, then NULL should be returned.

When there is more than one virtualizer stub, the order of processing is not currently defined. Clearly, the order of processing is important, since stubs that execute later will see the modifications of stubs that execute earlier. We may need to address this in future revisions of this architecture.

The primary purpose of having virtualizer stubs is to allow non-base virtualizers to establish a presence in each created process. Intervention at CreateProcess or DLL-load time is the best way to do this, since non-base virtualizers are often tied to platforms whose processes or DLLs can be recognized. For example, the JVM virtualizer is appropriate only to JVM processes.

The virtualizer stub first must recognize whether the executable being instantiated is one that it cares about. If so (and only then) it should do what is necessary to ensure its own insertion into the process. It can do this by altering the environment, the command line, the executable, or any combination of the three.

The virtualizer stub must ensure that any alteration it makes is semantics-preserving in the end. That is, after it gets control in the new process, the virtualizer must be able to restore the original behavior intended by the application even though some of that behavior is virtualized.

4.4.6 The Base Virtualizer Import Library

At times it is necessary for other virtualizers or their virtualizer stubs to invoke services of the BV explicitly. In some cases, the code of the original asset may be modified at preparation time to do the same. For this reason, the BV provides an import library for use by other virtualizers (as part of PDS development) or at preparation time (as part of asset preparation).

At runtime, imports via this library are resolved directly in the interceptor DLL or some other DLL provided by the BV implementation.

At present, the only functions in this library are projections of the DSPI.

extern void newContext(const char* contextName);
extern char* getShardPath(int shardIndex);

These are the corresponding functions of the DSPI with the context handle removed. The BV simply fills in the context handle for the EA and invokes the DSPI on behalf of its caller.

The getShardPath function is intended for use by other virtualizers which will need access to shards to do their job. See, for example, the discussion of the JVM virtualizer below.

The newContext function exists in the DSPI (see section 3.1) in order to tune the delivery subsystem's prefetch activities based on the asset's execution state. The current architecture doesn't dictate how the BV can identify states automatically, although doing this is a longer term objective. Instead, we provide the BV's newContext function which delegates to the DSPI. The intent is two-fold.

Other virtualizers can invoke newContext if they are able to do so. In particular, a virtualizer could elect to invoke newContext in its virtualizer stub, since creation of a new process is one obvious way in which a new execution context can be established.

The asset itself can invoke newContext if it was modified at prepare time to do so.

4.5 Non-Base Virtualizers

This section motivates why PDS supports non-base virtualizers and explains the general architectural features under which they operate.

The natural shard granularity employed by the BV is the file. Some files are large entities that have an internal structure and are accessed sparsely. One would like break such files into numerous shards so that the entire file would not need to be fetched unless all parts of it are accessed.

This could be done by dividing the file into arbitrary same-size pages, but the page boundaries would then have no semantic significance, making it difficult to recognize shard redundancy (for example, splitting up two moderately different copies of corejar into same-size pages would make it unlikely that the identical copy of java/lang/Object.class in each of them would be recognized and stored only once in the shard repository and SEC).

It would be nice to catch data input requests that operate at a granularity finer than a file, in such a way that their semantic significance can be recognized. If this can be done, then shard boundaries can be semantically meaningful (for example, each member of an archive becomes a shard) and shard redundancy can be readily recognized, allowing PDS to optimize shard storage and delivery.

The BV is already handling certain non-file or subfile requests that occur at OS level. For example, it separates file metadata from the file itself and it has special handling for registry entries. This could gradually be extended to cover major file structures defined by the OS (e.g., PE files). But, to go beyond that is difficult because there are numerous data format structures that exist within files that have no universal interception point within the OS for interpreting them. PDS's solution to this is to supply an open-ended plug-point for other virtualizers, operating above the level of the OS, in contexts where particular categories of subfile I/O can be recognized.

PDS will supply a few such virtualizers itself. As a practical matter, for a non-base virtualizer to be worth providing as part of PDS itself, it should be tied to some significant platform which makes predictable use of certain file formats and conventions. At present, the JVM virtualizer, tied to the Java 2 platform, is the only exemplar. A WAS virtualizer (tied to the more specific J2EE formats as extended by IBM) might be another, but this has not yet been designed. A DB2 virtualizer might also be possible, etc.

PDS also provides a general framework for adding non-base virtualizers as system extensions. This permits third parties to develop virtualizers for platforms that are of interest to a smaller community. PDS-provided non-base virtualizers use the identical framework. The framework consists of Virtualizer stubs, described in section 4.4.5.4. These give a non-base virtualizer the opportunity to modify process creation and library loading interceptions performed by the BV. This is one mechanism for a non-base virtualizer to gain control.

The BV import library described in section 4.4.6. This gives a non-base virtualizer limited access to the DSPI, allowing it to demand shards in the SEC and to declare execution contexts.

The Browsable interface described in section 2.5. By implementing this interface, a non-base virtualizer can tailor its AVM meta-shard format for its own needs, while still permitting generic PDS tools to inspect and navigate assets that use the non-base virtualizer.

The Preparer interface described in section 5 (preparation subsystem). This permits the non-base virtualizer to participate in preparation so that its shards (both primary shards and meta-shards, including its AVM) are incorporated into the AC and become part of the asset being prepared.

Note that the user is assumed to trust the PDS system and the provider of any AC whose assets he decides to execute. Thus, the PDS virtualizer framework is a "privileged" framework that gives the virtualizer author power to do things that, if abused, could corrupt the user's environment.

An asset preparer should only use virtualizers whose authors are trusted, such as PDS, the preparer himself, or a reliable third-party software provider. And, a virtualizer author must take care not to perturb the expected semantics of program execution (including security) in any way.

4.6 The WM Virtualizer

The JVM virtualizer (N) is a non-base virtualizer tied to the Java 2 platform. That platform makes heavy use of zip-format archives, frequently organized into class paths. The JV includes both a generic intercept for all zip-file reading, and a more specialized intercept for class paths that causes class path searching to be bypassed altogether.

Actually, the use of zip-format archives is not limited to JVMs. However, we lack a universal leverage point for zip file I/O, except within the JVM, where the java.util.zip.* and java.util.jar.* classes provide such a leverage point. Thus, we provide zip file redirection as a Java-only facility at this time.

The JV is divided into the classpath virtualizer, the zip file virtualizer, and the virtualizer stub. First, we discuss some implementation and packaging issues.

4.6.1 JV Implementation and Packaging

The JV is implemented mostly in Java, with a small amount of native code that allows the JV to interact with the BV.

Recall that all assets contain the transitive closure of their dependencies other than OS dependencies, and note that the JVM is usually not a part of the OS. Therefore, every asset that needs a JVM will typically contain a JRE or JDK to provide that JVM.

Exploiting the previous fact, the class files and DLL of the JV are not required to be installed with PDS but rather can be incorporated at preparation time into each asset that also contains a JRE or JDK. Redundant copies of the JV in shard repositories and the SEC are avoided by PDS's normal duplicate shard avoidance mechanisms.

The same consideration applies to other non-base virtualizers. In particular, non-base virtualizers that are not shipped with PDS would almost certainly be deployed in this way.

Because correctness of the JV depends on zip library, class loading, and security semantics of the JVM, there can be different versions of the JV required for sufficiently different versions of the WM. The strategy of incorporating the JV into the asset helps in managing this reality.

4.6.2 The Classpath Virtualizer

Definition: a classpath is a sequence of elements designated by URLs, where each element contains a directory/file structure.

Physically, some classpath elements are explicit directory/file structures to be navigated by file system interfaces, while others are single zip-formnat archives to be navigated by zip file library interfaces. Most classpaths in production environments consist primarily of archives, which is why they are of interest to the JV.

Java classloaders are under no obligation to use classpaths at all. But, the construct is extremely prevalent, and the supplied java.net.URLClassLoader implementation is designed to be subclassed by classloaders wishing to reuse the classpath paradigm. Most classloaders that use classpaths at all do so by inheriting from URLClassLoader.

In particular, the extension and system classloaders that come second and third (after the boot classloader) in the standard delegation sequence, inherit from URLClassLoader, as do the classloaders of tomcat, Eclipse 2.x and current WSAD. Eclipse 3.0 and future WSAD versions based on it do not inherit from URLClassLoader, but they also don't really use the classpath construct, and so do not contradict the general observation just made.

The classpath virtualizer (CV) is a major subcomponent of the JV which intercepts classpath read operations in two places.

It intercepts the constructors of URLClassLoader and its addURL, findClass, findResource, and findResources methods.

It intercepts resource loading in the boot classpath, which is done by specialized methods of lower level classes. There is no way to intercept class loading in the boot classpath without altering the JVM implementation even more intrusively, so the JV relies on a prepare-time reorganization of the boot classpath to get efficient boot class loading via the BV.

The CV determines if the class or resource being loaded is part of the PDS asset that is executing. If so, the load is redirected such that each class or resource is a shard. Because classpath operations are read-only, a direct mapping to shards in the SEC is possible, and no use of the shadow area is required. Because a classpath can be considered to be "frozen" at the time an asset is prepared, it is possible to do the redirection in a way that completely bypasses any actual classpath searching. Thus, the archives in the classpath are never actually opened in the file system.

The CV does not interfere with the loading of anything from outside PDS. For example, network classloaders (even when they inherit from URLClassLoader) behave the same regardless of whether the JV is present or not.

It is important to be clear that the CV does not guarantee interception of all data input operations performed by class loaders that might refer to classes inside a PFS. Classloaders that don't extend URLClassLoader are not intercepted, and those that do actual I/O themselves, bypassing the findClass, findResource, and findResources methods (for example, tomcat) are also not intercepted. These I/Os, if directed to a PFS, will be caught either by the zip file virtualizer or the BV.

Thus, we have two chances to catch each I/O efficiently, and three chances to catch it altogether (the last of which is "foolproof" as far as we know). This at least guarantees correct behavior.

4.6.2.1 Data Structures 4.6.2.1.1 Classpath Meta-Shards

The CV's preparer (see preparation subsystem) transforms each classpath into a tree of meta-shards with primary shards at the leaves. The transformed classpath preserves the classpath's semantics but is more efficient and more granular, fetching shards only when needed. The following describes the transformation, using a number of definitions to clarify the explanation. It is this transformed classpath that is employed at execution time.

Definition: a file-member is a "file" within an element of a classpath, i.e., either a real file in an element that is not an archive, or a simulated file within an archive.

Definition: a resource definition is an ordered list of file-members from a classpath, such that each file-member is in a different element of the classpath (a different jar or directory) but has the same path within its element. Each file-member in a resource definition can identify its associated code source URL, signing certificates, and jar manifest, if any.

For example, if com/ibm/pds/Foo.class appears twice in a classpath, its resource definition has two members. These might have the same or different contents. They will have different code source URLs, and possibly other meta-differences.

Some operations that are performed through a classpath, such as loadClass and findResource access only the first member of a resource definition. Others, such as findResources, access the entire resource definition via an Enumeration.

The CV's concrete representation of a resource definition is a list of pairs of SIs. Each pair comprises The SI of the shard containing the file-member's contents.

The SI of a meta-shard containing the code source URL, signing certificates, and jar manifest associated with the resource, if any. The jar manifest is incorporated indirectly via its SI, since it is also a file-member. Since many file-members share the same code source URL, signing certificates, and jar manifest, there are relatively few of these meta-shards.

Jar signing is partly processed at prepare time (and will fail if the jar file is corrupted in any way so as to compromise the assurance that the certificates represent the real signers of the jar). The certificates (signed by a certification authority) are presented at execution time, and the certificate authority signatures are checked at that time. The safety of this split approach is predicated on the security of the delivery subsystem being equivalent to that of a local file system (see section 3.7).

All the algorithms employed are the unmodified ones of the JVM and its security providers: PDS does not introduce any exposures resulting from changing these algorithms, only a possible exposure due to the delivery system being less tamper-proof than assumed.

Definition: a directory-member is a non-empty "directory" within an element of a classpath, i.e., either a directory in an element that is not an archive, or a simulated directory within an archive. The latter may be an explicit entry in the archive or may merely be induced by the presence of file-members in the archive whose path names imply the directory.

Definition: a package segment is a merge of directory-members in a classpath, such that each directory is in a different element of the classpath but has the same path within its element. The merge is accomplished by merging sub-directory-members into package segments and making file-members into resource definitions.

The CV's concrete representation of a package segment is as a map from segment name to child object, where the child object can be another package segment or a resource definition. If the child object is a package segment, it can be incorporated into the representation of its parent or placed in a different meta-shard. Thus, a large package segment can be organized into multiple meta-shards to be fetched in portions only when needed.

Definition: a classpath meta-shard (CPMS) is a meta-shard containing a representation of the root package segment (whose segment name is the empty string) of the classpath.

Example: Suppose a classpath has two elements. The first is foojar whose members are com/ibm/pds/Foo.class and org/apache/foo/Bar.class. Suppose the second element is barjar whose members are com/ibm/pds/Foo.class and com/ibm/pds/Bar.class. The CPMS for this classpath (ignoring some details such as code source URLs) would be

[com .quadrature. [ibm .quadrature. [pds .quadrature. [Foo.class .quadrature. RD(2), Bar.class .quadrature. RD(1)]]]

org .quadrature. [apache .quadrature. [foo .quadrature. [Bar.class .quadrature. RD(1)]]]]

In the notation above, RD(1) means a one-item resource definition, RD(2) means a two-item resource definition. Each time a package segment [ . . . ] appears to the right of the mapping arrow .quadrature., there is a possibility of moving that package segment to a different meta-shard or keeping it in the same one.

The CPMS guides the interception of class and resource loading via classpaths. It permits a fast lookup of a resource name to retrieve both its content shard SI and its meta-information SI. These can then be mapped as needed into the PDS SEC and loaded.

4.6.2.1.2 The JV Manifest

Definition: a classpath key is a string that denotes a classpath. It resembles the string-form classpaths used on the Java command line or the CLASSPATH environment variable, except that path names are both absolute and canonicalized to increase the likelihood that the keys of identical classpaths will be identical.

Definition: a JVM configuration is the identity of a JVM, plus the values of two operating parameters that affect what its boot classpath should contain. These are the −Xj9 parameter and the java.endorsed.dirs system variable, if either is specified. PDS does not support application overrides to the boot classpath except those accomplished via java.endorsed.dirs.

Definition: a JVM key is a string that denotes a JVM configuration. It is constructed by concatenating the JVM's java.home location with a representation of the values of the two critical operation parameters (see previous definition). Path names are absolutized and canonicalized as with the classpath key.

Definition: the class-only-explosion of a classpath is an explicit directory/file structure which, if used in lieu of the original classpath, would produce the same loadClass behavior (not necessarily the same resource loading behavior).

Concretely, the class-only-explosion is formed by unzipping all the archives into one directory, keeping only the earliest occurrence of each class file name, and discarding all the resources that aren't class files.

Definition: a boot-root is a QPN designating a directory/file structure inside a PFS that contains the class-only-explosion of the boot classpath for a JVM after the JV classes have been prepended to that boot classpath.

Definition: a bootpath definition is a pair consisting of a boot-root and a CPMS, both derived from the same boot classpath.

The JV manifest is the AVM for the JV. It consists of three parts: The first two parts are used by the CV. The second part is also used by the virtualizer stub as described in section 4.6.4.

A map from classpath keys to the CPMSs for the classpaths denoted by those keys. Boot classpaths do not appear in this map.

A map from JVM keys to the bootpath definitions for the JVM configurations denoted by those keys.

A zip file virtualizer manifest. The use of this manifest is described in section 4.6.3.

Recall that classpath keys and JVM keys both contain path names. Usually, these denote files and directories within PFSs. Thus, when classpath keys and JVM keys are recorded in the JV manifest, they are recorded as QPNs. When the JV manifest is read by the CV in support of a particular EA, the QPNs are turned into absolute path names eagerly so that key matching will be accurate on the target system.

4.6.2.2 Intercepting URLClassLoader Methods

The CV delivers all non-boot classpath interception by intercepting the methods of URLClassLoader.

4.6.2.2.1 URLClassLoader Constructors

The URLClassLoader constructors receive classpath designations in URL[ ] form. The constructor determines if the classpath should be redirected to PDS by proceeding as follows.

The classpath key for the entire classpath is computed from the URL[ ] form and looked up in the JV manifest. If it matches, the URLClassLoader instance is primed with the CPMS for the classpath and all findXXX methods will be intercepted.

If the entire classpath is not a match in the JV manifest, a second check is made whether each element of the classpath is individually a match when it alone is considered as the classpath key. If all of the elements of the classpath have CPMSs, those CPMSs are merged (as described in section 4.6.2.2.2 below) to form a single CPMS. The instance is primed with the merged CPMS.

If neither step 1 nor step 2 has resulted in a match, the interception is abandoned and the URLClassLoader behaves as if the CV were not present.

The strategy of first looking for an exact match on the classpath as a whole and then on individual entries is a guard against two phenomena.

It is impossible to anticipate at prepare time all the classpaths that may arise at execution time. "Important" ones can be observed and prepared for. For others, one can at least determine the archives within the asset that are likely to appear in classpaths. If CPMSs are available for these individually, then they can be merged to form a valid CPMS at execution time.

Some classpaths have predictable contents but not predictable order. This is true of the extension classpath (where a directory containing any number of archives is, by design, designated as the extension directory). It is also true as a side-effect of the configuration options of some popular subsystems such as tomcat (which also support an "all jars in this directory" option). In this case, we can, through control of the preparation process, determine a likely order, and put the complete classpath in the manifest in that order.

We also prepare the individual archives, so if they are presented in a less likely order, the interception can still be activated and will still work.

4.6.2.2.2 Merging CPMSs at Runtime

We previously described a complete merge of package segments as part of the description of the CPMS (section 4.6.2.1.1). That kind of merge makes sense at prepare time, since, at that time, examining all the sub-directories of a directory being merged raises no special performance issues. When CPMSs are merged at runtime (in the interception of a URLClassLoader constructor or of the addURL method), we do not want to fetch any package segments that are in separate meta-shards because this will cause quite a bit of I/O when it is not yet clear which classes are actually needed. Therefore, at runtime, we merge CPMSs in a "lazy" fashion.

If a package segment's definition is present in the already-fetched meta-shards of every CPMS being merged, the merge is performed eagerly, resulting in a single package segment.

If a package segment's definition is not yet fetched for at least one CPMS being merged, the package segment is represented by a placeholder, listing the SIs of the meta-shards needed to complete the merge. The merge will be completed only when the contents of the package segment is actually needed to resolve an intercepted class load or resource load request.

4.6.2.2.3 The addURL Method

When addURL is called and PDS interception is active for the URLClassLoader (it has a valid CPMS for the current classpath), the classpath key of the new URL is looked up in the JV manifest to determine if there is a CPMS for the new URL. If so, the runtime merge algorithm is performed, yielding the new CPMS. If not, PDS interception is abandoned by the URLClassLoader instance, which reverts to normal classpath searching. PDS will still intercept I/O to its zip files in the zip file virtualizer and will intercept I/O to any of its files in the BV.

4.6.2.2.4 The findClass Method

The findClass method is the lowest level of several methods implemented by URLClassLoader that are capable of being overridden. The assumption is that classloaders inheriting from URLClassLoader continue to call the superclass findClass method to perform the actual class loading even if they do other things (such as changing the classloader delegation hierarchy) in higher level methods. There is no guarantee that this is actually the case.

But, a violation of this assumption, although it causes the CV to be bypassed, does not lead to incorrect behavior, since the zip file virtualizer and the BV also have opportunities to intercept the request at the level of zip file I/O and file I/O, respectively.

The PDS version of findClass only operates if the URLClassLoader is doing interception as decided at construction time and possibly amended at addURL time. If interception is active, the class name is looked up in the CPMS to find the resource definition for the class.

The first SI pair in the resource definition is used to fetch the bytes of the class and also its code source URL, signing certificates, and jar manifest. The existing facilities within URLClassLoader and SecureClassLoader are used to enforce the Java 2 security model with respect to the loaded class.

4.6.2.2.5 The findResource and findResources Methods

These methods operate at an analogous level to findClass and have similar issues. If the methods are intercepted, they function as follows.

findResource returns a URL whose URLStreamHandler will open the first shard of the resource definition, but whose visible path name is the one expected by the application.

findResources returns an Enumeration that will produce URLs as in the previous item, for each shard in the resource definition.

4.6.2.3 Intercepting Boot Classpath I/O

Because most JVMs load classes from the boot classpath in native code (and start doing so before any Java level interception can possibly be active) redirection of boot classpath class loads cannot use the techniques otherwise used within the CV. Instead, boot strap class loads are handled directly by the BV. To achieve better shard granularity, the boot classpath is "exploded" to form a PFS as described in section 4.6.2.1.2.

While the exploded directory approach is both necessary and sufficient to handle class loading via the boot classpath, it is neither necessary nor sufficient to handle resource loading. It isn't necessary because resource loading from the boot classpath is actually done by pure Java technology code in all recent IBM JVMs. This is not guaranteed by the J2SE (Java 2 architecture), it is simply an observed fact. It isn't sufficient because the findResources method wants to see every occurrence of a resource, whereas a single-directory exploded boot classpath can only contain one. A multiple-directory exploded boot classpath is possible, but would sacrifice efficiency in order to support the correctness of a rarely used facility.

The CV redirects boot classpath resource loading by intercepting private methods of ClassLoader (in the sovereign JVM) or BootstrapClassLoader in the J9 JVM. When the JVM initializes, the JVM key is computed and looked up in the JV manifest. If it is matched by a JVM definition, the CPMS for the boot classpath is read and is available to perform resource loading redirection as described in section 4.6.2.2.5. If not, then boot classpath resource loading is not intercepted.

4.6.3 The Zip File Virtualizer

The zip file virtualizer (ZV) has a manifest whose top level keys are zipfiles that this asset needs virtualized. Because these are under PDS mount points, their names will be QPNs, which are turned into absolute paths when the manifest is read.

The zip file virtualizer monitors all zip file opens and activates when there is a match on zip file name.

The ZV manifest maps each zip file name to an FSM (file system manifest) identical in structure to the FSMs used by the BV. However, these FSMs describe the internal "filesystem" within the zip file, not a PFS under a PDS mount point.

The zip file virtualizer intercepts member opens and member reads in such a way that these are redirected and read PDS shards instead.

4.6.4 The JV Virtualizer Stub

The JV virtualizer stub must detect and intercept all JVM creations where the created JVM is defined as part of the asset. We consider both the mechanics of interception and the actions performed at interception time.

4.6.4.1 Mechanics of Interception

The virtualizer stub can use either the interception point provided by modifyExec or that provided by modifyLoad. The former results in a simpler implementation but catches only JVM creations that use the java.exe or javaw.exe launcher programs. The latter adds some complexity but catches all JVM creations.

At modifyExec time, the stub checks whether the executable ends with /java.exe or /javaw.exe. If so, it might be eligible. The stub infers the java.home location from the executable name and forms the JVM key from that plus other command invocation arguments. If the JVM key matches an entry in the JV manifest, then command line will be modified. Otherwise, the virtualizer stub does nothing.

At modifyLoad time, the stub checks whether the executable ends with /jvm.dll. If so, it might be eligible. The stub infers the java.home location from the executable name and checks the JV manifest to see if it has any JVM keys that could possibly be matched from that java.home. If so, it replaces jvm.dll with its own dispatcher DLL for jvm.dll (see section 4.1.1 for a definition of dispatcher DLLs). That dispatcher DLL forwards all calls to the original jvm.dll except for JNI_CreateJavaVM.

The latter call is redirected to an implementation provided as part of the JV. For this to work correctly, the stub must also check for the special case when jvm.dll is implicitly loaded by its own dispatcher DLL and simply allow that load to happen.

When a JNI_CreateJavaVM call is intercepted, the interceptor completes the computation of the JVM key using information from the JavaVMInitArgs/JavaVMOption structure. If the JVM key matches an entry in the JV manifest, then the JavaVMInitArgs/JavaVMOption structure will be modified. Otherwise, the virtualizer stub does nothing before forwarding the call to the intercepted jvm.dll.

4.6.4.2 Actions Performed at Interception Time

Regardless of which interception point was used, the stub will have a boot-root definition obtained by looking up the JVM key in the JV manifest. It uses this boot-root to alter the boot classpath of the JVM invocation so that it will use the boot-root PFS instead of the original classpath. The original invocation arguments must not themselves change the boot classpath (except via the supported mechanism of java.endorsed.dirs). The invocation is also augmented with several java system properties to identify the native library portion of the JV and the JV manifest so that the JV's Java code can initialize.

4.6.4.3 Other Native Functions Packaged with the Virtualizer Stub

The JV code requires a native method so it can invoke the BV's getShardPath function. This is packaged with the virtualizer stub in the same DLL. The same DLL also exports a function that the service subsystem can use to obtain a copy of the JNI_CreateJavaVM outputs. The service subsystem can then use JNI to access the JVM for its own purposes.

4.7 The Updater

By causing every asset to contain the closure of its dependencies, PDS aims to substantially eliminate the usual practice of maintaining complex dependency vectors on the target machine. However, every asset is dependent on some version of the OS and of PDS itself. The OS version can be checked and the launch of an asset aborted if it cannot run on the target OS. PDS can be carefully designed for backward compatibility so that it is safe to let the PDS version on a target machine monotonically increase as needed. But, we require a transparent and automated procedure for increasing the PDS version to the minimum level needed so that this does not become an end-user chore.

As has been discussed, non-base virtualizers are typically incorporated into assets, so the precise version required is always present (and different versions of non-base virtualizers can coexist in a machine, as long as each asset chooses one). However, the bootstrap and base virtualizer are needed to get started, so updating them is a special case.

Rather than engaging in the complex logic inside these components that would be needed to make them self-updating, it is simpler to provide launchers with a facility to update these components, if necessary, before using them. That is the facility that the updater provides.

The updater exports a single checkVersionAndUpdate function that can be called by launchers. The launcher declares the minimum version of PDS that it needs in order to execute the asset safely. The launcher checks whether the key PDS components are at that version level by checking its own version level (the updater always updates itself when it updates the other components). If the current version is adequate, it simply returns.

If not, the updater uses a standard AAN naming convention to locate the asset whose purpose is to install the correct version of PDS. This asset's asset initiator is started in the usual way, and its effect is to install the proper version of PDS, replacing even the updater itself. If the updater cannot locate the correct asset, or its execution fails to update the system properly, it returns an error.

The design of the updater must take care in the local file system so that the PDS critical components are left in a consistent state: either completely updated or not updated at all. In fact, this is trickier than it sounds because PDS components may be in use by other EAs at the time an update is performed. The solution may involve naming PDS DLLs and other executables in a way that allows multiple copies to coexist without causing sharing conflicts.

As a matter of convenience for writing launchers, the bootstrap and the updater should use the same import library so that a launcher that calls both the updater and the bootstrap can be written easily.

4.8 Launchers

A launcher is simply a program that invokes the PDS bootstrap and/or updater. The bootstrap is the official "entry point" to PDS services, so, launchers can be thought of as outside the PDS architecture, in a "user" role. However, a practical PDS deployment must provide some practical launchers, and PDS provides some useful samples. Here are the tasks that a launcher must perform.

A launcher must be aware of PDS asset naming conventions. That is, it must understand what ACURIs and AANs denote, so it can help the user with launching the correct asset. We assume that quite a bit of meta-information about assets is recorded, although we've chosen in this architecture not to be prescriptive about what meta-information must be recorded and where.

A launcher must be aware of the requirements of the delivery subsystem, so that it can provide an appropriate delivery license.

A launcher must be aware of PDS version numbering conventions and of which ACs depend on which PDS versions (this is critical meta-information that should be published when the AC is published).

We now describe two "sample" launchers, a command-line launcher and a web launcher.

4.8.1 A Command Line Launcher

A sample command line launcher to be shipped (in source form) with a PDS reference implementation might look something like this.

Its command line syntax requires an ACURI as its first argument and an asset name as its second (together these constitute an AAN and designate an asset).

Its remaining arguments constitute the command line to be passed to the asset initiator.

It uses the environment and current directory it was invoked with to invoke the bootstrap.

It obtains the delivery license via an environment variable.

4.8.2 A Web Launcher

A web-based launcher to be shipped (in source form) with a PDS reference implementation might look something like this.

It is associated with a unique file extension (e.g., .pds) that might, by convention, appear on documents served via a web browser.

Those documents contain an AAN, a delivery license, and possibly other arguments to be passed to the bootstrap.

When the document is served, the web launcher invokes the bootstrap with the supplied arguments.

5 The Preparation Subsystem

The job of the preparation subsystem is to create an asset collection from one or more software offerings (applications). If the offering can be installed in substantially different ways, an asset will reflect both the offering and a particular installation. Thus, an asset collection may contain several assets for the same offering.

When the collection is published it becomes immutable. Publishing an asset collection entails assigning it a unique ACURI. Asset preparation occurs before an asset collection is published.

Although much of the preparation process is automated, it is driven by preparation instructions that are provided by humans. We assume that a tools environment will eventually be developed to help developers analyze potential assets and create their instruction sets. This overview does not explore these "pre-preparation" issues in detail, although we will enumerate some of the tasks at a high level.

The remainder of this section assumes that assets are prepared for a PDS host running Windows, Preparation for Linux and other operating systems will be similar but with different warts and wrinkles 5.1 Steps of Preparation Assets are added incrementally to an incipient asset collection.

From the standpoint of a developer driving the preparation process, adding an asset consists of the following steps (these may eventually be guided by tools in an IDE).

Installing the offering on a preparation machine in a manner that captures the registry and file system dependencies that occur during installation.

Writing an asset initiator for the asset or choosing to use the default asset initiator. We discuss this in section 5.8.

Identifying the file system mount points for the asset.

Identifying the zip files of the asset that may be accessed from Java or choosing to let this be automated (see section 5.7.2).

Identifying the JVMs used by the asset and their relevant classpath configurations.

Gathering the information from steps 1-5 into the preparation instructions.

Running the preparation utility. The preparation utility then performs these sub steps. Transforming the import tables of asset executables so that references to fronted DLLs are replaced by dispatcher DLL references as described in section 4.4.5.2.

Adding the shards for the asset to a shard depository and updating the SDM to reflect the new shards.

Creating a Base Virtualizer manifest shard for the asset.

Optionally, creating other virtualizer manifests with entries for them in the Base Virtualizer manifest.

Registering the asset and updating the collection's ANM.

5.2 Asset Collection Physical Format (ACPF)

Recall that the delivery subsystem must accept asset collections prepared in ACPF and may (but need not) maintain them in this format.

Eventually, shard data may optionally be stored encrypted and/or encoded. Currently, we do not define these details in the architecture.

The ACPF assigns each shard a file name that is a function of the shard's shard digest. A shard with digest d will be assigned the following path:

% REPOSITORY_BASE % shardhex(pre(0, d))\hex(pre(1, d))\ . . . \hex(pre(n−1, d))\hex(d)

where

% REPOSITORY_BASE % is a directory that may vary between shard repositories, hex(x) maps a sequence of binary digits, x, to the corresponding sequence of hexadecimal ASCII characters, and pre(i, x) is the ith prefix of a binary sequence x where the length of each prefix is to be determined.

Currently, we plan to always take n=1 and the length of the only prefix to be 15 (possibly 16) bits. This should accommodate repositories of around two billion shards.

To accommodate larger repositories, we plan to move to a heterogeneous scheme where the number of prefix directories can vary for different shards. The maximum capacity for each prefix directory would be partitioned into n slots reserved for shard files and 2 Am slots reserved for prefix subdirectories (where n or m could be 0). As shards are added to a directory they are assigned to files in that directory until the slots reserved for files are used up. After that, shards are partitioned among the prefix subdirectories based on the next m bits of their digest. This scheme will handle arbitrarily large repositories without requiring that each shard have the maximum possible number of prefix directories.

The optimal maximum size of a directory has yet to be determined.

The ACPF also assigns a directory to each ACURI under % REPOSITORY_BASE % and, within each such directory it assigns a directory to each asset name. The ANM and SDM for each asset is stored in the asset-specific directory.

5.3 Shard Depositories

A shard depository is the preparation-time object that represents the ACPF output of preparation for a given asset collection. It is responsible for accepting an array of bytes and either adding it to the shards for an asset collection, if its shard digest is unique, or identifying the SI of the shard with the same digest already in the collection.

The depository also identifies and patches executable shards.

5.4 Pluggable Preparers.

Each kind of virtualizer has its own preparer. This is a Java class that implements the com.ibm.pds.preparer.Preparer interface. This entails implementing a method with the following signature:

public void prepare (Properties instructions, BVPreparer builder)

throws IOException, InstantiationException, IllegalAccessException, ClassNotFoundException;

The builder parameter will be described below. The instructions parameter is a properties object with one property of the following form:

preparer=fqcn where fqcn is the fully qualified class name of the virtualizer's Preparer class.

Reflection is used to invoke the prepare method of this class. The remaining instructions are used to tell the preparer what to do. The specific format of these properties depends of the type of the virtualizer.

5.5 The Base Virtualizer's Preparer

The BVPreparer performs two roles: it prepares the BVM and it is the builder argument passed to other virtualizer's preparers.

In the second role it has four public methods: addFileSystem, addVirtualizer, and addRegistryEntry, that preparers can use to root their data structures in the base manifest.

In its first role, a BVPreparer takes an instructions parameter (its second parameter will usually be itself). The properties of this file have the following forms name=NAME, associates NAME as the name of the asset being prepared.

asset.initiator=QPN, the QPN of the asset initiator for the asset. If this parameter is omitted, the default asset initiator will be used.

xml.doc.file=FILE, FILE is the destination for a (nearly) human readable form of the manifest.

registry.VAR=VALUE, indicates that VALUE is to be assigned to variable VAR in the virtual registry for the running asset.

instruction.file.list=IFL, IFL is a ";" separated list of files containing instruction properties for other virtualizers.

The prepare methods of these virtualizers are invoked reflectively using the "preparer" property of its instructions. This method is passed the appropriate instructions property and the BVPreparer itself.

After all of the instructions have been processed, the BVPreparer has accumulated a name, an asset initiator, and three sets: file systems, virtualizers, and registry entries.

This information, except for the name, is placed in the BVM as described in section 4.4.3. The name is recorded in the ANM along with the SI assigned to the BVM by the shard depository.

5.6 The File System Preparer

There is not a File System Virtualizer, but FSPreparer.prepare is invoked as if there was.

The properties in its instructions parameter have the following form:

1) preparer=com.ibm.pds.fs.preparer.FSPreparer, enables reflective invocation 2) xml.doc.prefix=PREFIX, (nearly) human readable versions of each file system are written to file that begin with this prefix and continue with the name of the mount directory.

3) mount.points=DIRS, where DIRS is a ":" separated list of directories that are to be sharded.

Each file under the mount points is passes to the shard depository to be added to the collection if its digest is (so far) unique During file system preparation, the FSPreparer can optionally record all of the zip format archives encountered. One option of the JV preparer is to use this file as input to the preparation for the zip file virtualizer.

5.7 The Java Virtualizer's Preparer

The JV preparer prepares information for both the CV and the ZV. It is driven from a single instructions file but uses other files to control preparation details. Some of its instructions are relevant to CV preparation and some to ZV preparation. The instructions that are relevant to the overall JV preparation task are preparer=com.ibm.pdsjv.preparer.JVPreparer enables reflective invocation.

xml..doc.file=FILE, location of (nearly) human readable form of the JV manifest.

jvm.N.key=JVMKEY where N is a small integer and JVMKEY is a JVM key as defined in section 4.6.2.1.2.

jvm.N.bootclasspath=CPKEY where N is a small integer and CPKEY is this the classpath key (as defined in section 4.6.2.1.2) of the boot class path for the JVM configuration denoted by jvm.N.key.

jvm.N.bootjar=JAR where N is a small integer and JAR is the name a Jar file containing JVM-specific PDS interception code for this particular build of the JVM

* properties of forms 3, 4, and 5 are repeated for consecutive values of N starting with 1 to cover all the JVM configurations used by the asset.

The JV preparer does the following.

It runs CV preparation as described in 5.7.1. Because the CV preparer must analyze the boot classpath of every JVM, this step also sets up common interception logic for the JVM that is used by ZV as well as the CV.

It runs ZV preparation as described in 5.7.2.

(the previous steps have put information in the JV manifest's in-memory representation). It writes out the JV manifest into the shard depository obtaining its SI, which it converts to a string.

It puts the JV's native code DLL into the shard depository as a shard (its java code was added on a JVM-specific basis in step 1).

It calls builder.addVirtualizer to add an entry for the JV. This specifies the JV's name and DLL, and the string form SI of the JV manifest from step (3) as its virtualizer cookie.

5.7.1 The CV Preparation Substep

An additional instruction used for CV virtualization preparation is classpath.definitions=FILE, location of a file containing classpath definitions, one per line. The form taken by each classpath definition is a classpath key as defined in section 4.6.2.1.2.

The CV preparation subtask consists of the following.

For every classpath in the classpath.definitions file, the CPMS of the classpath is created and stored in the shard depository along with the primary shards and meta-shards references by all the resource definitions in that CPMS. An entry is added to the JV manifest's map of classpath keys to CPMSs.

For every set of jvm.N.* parameters, the following substeps are performed.

The CPMS of the boot classpath is created and stored in the shard depository along with its implied contents (same process as step 1).

Shards are added to the shard depository representing the contents of the jvm.N.bootjar parameter.

The CPMS of step (a) is converted to a directory element within a file system manifest, employing the shards already in the depository from steps (a) and (b). The QPN of this directory will become the boot-root for the JVM definition.

An entry is added to the JV manifest's map of JVM keys to JVM definitions using the CPMS and boot-root of steps (a) and (c).

The entire set of directory elements generated by the iterations of step 2c are made into subdirectories of one virtual directory, with each subdirectory called "jvm"+N for that JVM configuration. Recall that these are the boot-roots for those JVMs. That virtual directory becomes the root of a PFS described by an FSM.

The FSM generated in step 3 is added to the BVM by calling builder.addFileSystem. This makes all of the boot-roots "visible" in the virtual file space of the asset.

5.7.2 The ZV Preparation Step

Additional instructions used for ZV virtualization (syntax details TBD) will set up the ZV preparation to do one of the following.

Accept a file generated by the filesystem preparer listing all the zip format archives in the asset. All will be prepared.

Accept an explicit instruction file containing zip format archives in the asset that are to be prepared.

Perform zip file preparation for any archive mentioned in any classpath in classpath.definitions.

The union of 2 and 3.

In any case, the step begins by identifying a set of zipfiles in the asset for which preparation will be done. For each zip file, the following steps are performed.

Generate shards in the shard depository for all the non-directory members of the archive.

It is never harmful to do this redundantly because the depository detects duplicates. However, it is a time saving to suppress this step if the CV preparation has already done it, for example when the zip file is obtained using options 3 above.

Create an FSM from the zip file directory. This contains the logical directory/subdirectory structure of the filesystem within the zip file and refers to the shards created in step 1 by SI.

Add an entry to the JV manifest's map from zip file QPNs to FSMs as described in 4.6.3.

5.8 The Asset Initiator

The asset initiator gets control from the PDS bootstrap when an asset is placed into execution. Its purpose is to define what operations an asset exports to its invokers. Concretely, it analyzes the command line, environment, and current working directory supplied by or inherited from its invoker and decides which (if any) executable to invoke and with what command line, environment and CWD.

The asset executes under control of the BV, and hence all of its file system operations (including any CWD it nominates) are virtual. The executable nominated by the asset initiator can be defined within a PFS of the asset or can come from outside the asset. It will still execute within the virtual space of the asset.

The asset initiator is thus "asset aware" but not "PDS aware." That is, it is aware of its role in gating access to the asset but it need not know any particular PDS-specific interfaces. It operates by using normal OS calls, which are virtualized for it by the BV.

Writing asset initiators that control what operations are exported by the asset increases serviceability by defining what things are and aren't going to be supported. But, an asset initiator can also be "open" meaning that it permits the invoker to specify executables by path and not just by naming logical functions. The degree of openness can be controlled to be as much or as little as the asset provider wishes.

The default asset initiator that is used if none is written by the asset preparer is a totally open one. It simply passes takes the command line, environment, and CWD from its invoker and creates precisely the process implied.

6 The Service Subsystem

The service subsystem, like the delivery subsystem, is largely a pluggable component. The PDS architecture does not constrain such issues as the management of user identities, identification of specific service provider and server consumer roles, how problems are tracked, how service providers and consumers conduct human-human communication, etc.

Different instances of the service subsystem can be developed and deployed with different solutions to these issues. Often, the delivery and service subsystems will share a common policy layer so that management of user identities and access rights can be done in common.

What the PDS architecture does specify is how the service subsystem communicates with other PDS subsystems in order to service both assets and PDS itself.

Each service subsystem exports a service subsystem process initialization (SSPI) function. The SSPI is invoked by the process creation stub in step 8 of the BV's handling of CreateProcess (see section 4.4.5.3). This gives the service module a potential presence in every process of an EA and is the primary means for servicing executing assets.

The SSPI is allowed to issue its own openCache call to the delivery subsystem. It is not constrained to use the DSPI only via the BV's import library as non-base virtualizers are. The full services of delivery are thus available. This permits special ACs containing service components to be deployed independently of the ACs containing the user-visible assets. The SSPI can thus load additional code and initiate additional threads that are capable of observing and instrumenting the code of the asset itself.

A typical SSPI will try not be intrusive and so will typically limit itself to starting a thread that awaits instructions from outside the process. The mechanics of IPC used by different service subsystem implementations is not constrained by this architecture. Each virtualizer (base and non-base) exports optional functions for use by the service subsystem. These can be divided into two classes as follows.

Functions that aid in diagnosing problems in PDS itself.

Functions that admit the service subsystem to the virtualizer's view of the asset. For example, the JV makes the JNIEnv and JavaVM pointers from each JNI_CreateJavaVM call available for use by the service subsystem in the same process. This allows the service subsystem to (for example) attach additional VM threads, load additional classes, etc.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments.

Furthermore, it is intended that the appended claims cover any and all such applications, modifications, and embodiments within the scope of the present invention.

The invention claimed is:

1. An information processing system comprising:
a preparation machine comprising an installed image;
an execution machine on which the installed image is virtually installed; and
a virtualizer virtualizing the installed image on the execution machine, producing a virtually installed image by using a hierarchy of selective virtualizers;
wherein the virtualizing is selective such that not all operations of executing software of the installed image at any particular level are virtualized;
wherein the virtualizing comprises steps of:
defining virtualization of the virtually installed image by characterizing a hierarchy and selectivity of the virtualization, such that said virtualization is both selective and hierarchical;
emulating on the execution machine a platform native to the preparation machine;
emulating on the execution machine a virtual machine of the application;
emulating on the execution machine other applications interacting with the application;
dividing software assets of the installed image into shards, said shards comprising variable size, semantically-determined pages;
executing the software assets on the execution machine as if said software assets were installed on said execution machine, wherein the executing step comprises:
intercepting requests at multiple levels; and
redirecting the requests to code that emulates the behavior of the application installed on the preparation machine; and
integrating the execution of the software assets with the virtualizers, such that execution information can be collected efficiently about execution problems on the execution machine.

2. The system of claim 1, wherein the virtualizer further emulates on the execution machine a native platform of the preparation machine.

3. The system of claim 2, wherein the virtualizer further emulates on the execution machine a virtual machine of the application.

4. The system of claim 3, wherein the virtualizer further emulates on the execution machine other applications interacting with the application.

5. The system of claim 1, wherein the operation includes a read operation.

6. The system of claim 1, wherein the operation includes any one of a write operation and an execute operation.

7. The system of claim 1 wherein the installed image comprises multiple semantic levels of an application and its non-operating system dependencies.

8. The system of claim 7 wherein each of the selective virtualizers is responsible for partially virtualizing different semantic levels of the application.

9. The system of claim 1 wherein virtualization occurs where needed and more than one selective virtualizer can be active in a process.

10. The system of claim 1 further comprising an associative backing store for storing the shards.

11. The system of claim 10 wherein the virtualizer further integrates the execution of the software assets with the associative backing store, such that software information about said software assets and their versions can be collected.

* * * * *